US006450523B1

(12) United States Patent
Masters et al.

(10) Patent No.: US 6,450,523 B1
(45) Date of Patent: Sep. 17, 2002

(54) STEERING METHOD FOR A TRAILING SECTION OF AN ARTICULATED VEHICLE

(76) Inventors: Nathan E. Masters, 3168 Hwy. 308, Raceland, LA (US) 70394; Andrew C. Masters, 3168 Hwy. 308, Raceland, LA (US) 70394; Connie R. Masters, 3168 Hwy. 308, Raceland, LA (US) 70394

( * ) Notice: Subject to any disclaimer, the term of this patent is extended or adjusted under 35 U.S.C. 154(b) by 0 days.

(21) Appl. No.: 09/721,214

(22) Filed: Nov. 22, 2000

Related U.S. Application Data

(60) Provisional application No. 60/167,077, filed on Nov. 23, 1999, and provisional application No. 60/204,513, filed on May 16, 2000.

(51) Int. Cl.[7] ............................. B62D 53/06; B62D 13/00
(52) U.S. Cl. .................... 280/426; 280/423.1; 280/442; 280/476.1
(58) Field of Search ............................ 280/426, 442, 280/419, 476.1, 423.1, 460, 411.1

(56) References Cited

U.S. PATENT DOCUMENTS

| | | | |
|---|---|---|---|
| 2,342,697 A | * 2/1944 | Runyan ....................... 280/426 |
| 4,451,058 A | 5/1984 | Curry |
| 4,586,578 A | 5/1986 | Brown et al. |
| 4,600,210 A | 7/1986 | McMurray |
| 4,720,119 A | 1/1988 | Ritter |
| 4,768,802 A | 9/1988 | Winkler |
| 4,824,135 A | 4/1989 | McGregor |
| 5,329,451 A | * 7/1994 | Notsu ......................... 280/442 |
| 5,364,117 A | 11/1994 | Keith |
| 5,382,041 A | 1/1995 | Keith |
| 5,392,872 A | 2/1995 | Ducate |
| 5,393,084 A | * 2/1995 | Kleysen ....................... 280/426 |
| 5,558,350 A | * 9/1996 | Kimbrough et al. ......... 280/426 |
| 5,579,228 A | * 11/1996 | Kimbrough et al. ......... 280/426 |
| 5,626,356 A | 5/1997 | Harwood |
| 5,924,716 A | 7/1999 | Burkhart, Sr. et al. |
| 6,036,217 A | 3/2000 | Barkhart, Jr. et al. |
| 6,105,981 A | 8/2000 | Buelt et al. |

OTHER PUBLICATIONS

Ackerman Illustrated, www.muller.net/karting/docs/technical/ackerman.html.
Lab 3: Gears—*Background Informatin*, www. gateway.eng.ohio-state.edu/Labs/Gears/Gears.html.

* cited by examiner

*Primary Examiner*—Brian L. Johnson
*Assistant Examiner*—Matt Luby
(74) *Attorney, Agent, or Firm*—Phelps Dunbar, L.L.P.

(57) ABSTRACT

This invention relates generally to systems used to steer trailing sections of articulated vehicles and trailers. The preferred embodiment of this invention is a steerable dolly that can be manually and/or automatically switched among multiple modes. The dolly receives its primary input from the angle of the rear of the front trailer (or other towing vehicle). There are at least two modes. In one mode the wheels of the dolly are steered in the opposite direction as the rear trailer, providing more maneuverability. In the other mode the wheels are steered in the same direction, providing a more stable mode. It is envisioned that the more stable mode would be used at high speeds while the more maneuverable mode would be used at lower speeds. There is also disclosed an alternate steering algorithm, which provides for additional maneuverability beyond that of the mode in which the wheels are steered in an opposite direction.

8 Claims, 13 Drawing Sheets

STEERING METHOD FOR A TRAILING SECTION OF AN ARTICULATED VEHICLE

This application claims the benefit of U.S. Provisional Application(s) No(s).:

No. 60/167,077 filing date Nov. 23, 1999

No. 60/204,513 filing date May 16, 2000.

TECHNICAL FIELD

This invention relates generally to systems used to steer subsections of articulated vehicles and trailers and specifically to steering systems controlled by a microcomputer or a programmable controller to follow a lead subsection. The invention generally relates to articulated vehicles and trailers with three or more subsections. The invention also includes provisions for a plurality of operator selectable steering modes as well as a plurality of automatic steering modes.

The preferred embodiment of the invention demonstrates a way of applying the principles of the invention to dollies used in over-the-road tractor-trailer combinations. The desired steering axle angle is primarily a function of the angle between the steered section (the dolly) and the section in front of the steered section. Additional data and additional algorithms can be used by the software of the programmable controller to provide a refinement of the steering response.

BACKGROUND OF THE INVENTION

Over-the-road transport companies find it difficult at times to compete with other freight haulers because of weight limits on the roads and bridges. Multi-trailer arrangements are a possible solution to some of these problems because they spread the load over a longer stretch of pavement and reduce the columnar loading on bridges. These arrangements generally involve a semi-trailer carried by the tractor with one or more full trailers composed of semi-trailers carried by "dollies".

The most common and widely used dolly is the standard Type A dolly, which hitches to the towing vehicle or first trailer using a single point hitch. The standard Type A dolly provides "wagon tongue" steering for the trailer it is carrying by allowing the entire dolly to steer relative to its semi-trailer about the fifth wheel vertical axis on the dolly as well as relative to the towing trailer about the single point hitch vertical axis. The dolly tires do not, however, steer relative to the dolly frame.

Commercial vehicles of either truck and full trailer or multi-trailer configurations which employ the standard Type A dollies generally possess undesirable characteristics such as limited maneuverability and instabilities caused by rearward amplification. Rearward amplification, sometimes described as a "crack-the-whip" phenomenon, implies that in rapid evasive maneuvers such as emergency lane changes, the rearward elements of the vehicle train such as the dolly and the trailer carried by the dolly experience motions which are substantially amplified compared to the motions of the towing tractor and first trailer. Rearward amplification is known to be the basic cause of many accidents in which roll over of the last trailer or second trailer occurs while the remaining elements of the vehicle remain unscathed.

A second general class of dollies known as Type B dollies represent an improvement over standard Type A dollies. Type B dollies are generally characterized by a double tow bar arrangement which eliminates steering of the dolly with respect to the towing vehicle, most commonly the first trailer. The Type B dollies have been effective to a degree against some of the instability problems and are slightly more maneuverable than the standard Type A dollies. However, they cause other problems such as introducing other types of instabilities, causing stresses on the rear of the forward trailer, and increasing unloading delays due to difficulty in accessing the back of the forward trailer for some configurations.

Lengthy trailer combinations have always been plagued by these same two problems of instability and lack of maneuverability. Many transport companies have looked toward steerable dollies as a possible solution to these problems. Steering systems for dollies generally make use of Ackerman geometry and generally derive from modifications to the standard Type A dolly. With Ackerman geometry all tires of the dolly and the tires on the rear axles of both the first and any subsequent trailers are aligned tangent to circular paths which all have the same turn center. Ackerman geometry is the most desirable steering configuration for low speed maneuvering since it minimizes tire scuffing, wear and structural stress. With some modifications, Ackerman geometry can be adapted to provide stability when traveling at higher speeds, but this stability comes at the expense of maneuverability. An example of Ackerman geometry as applied to the steering of the rear tandem wheels of a semi-trailer is disclosed in U.S. Pat. No. 2,342,697.

The prior art teaches ratio steering systems for dollies with two principal steering modes. When the steering axle of the dolly is steered in a direction to make it initially more nearly parallel to the back of the trailer it is following, the behavior of the dolly and of the system as a whole tends to greater stability. This mode of steering could be called the stability type of ratio steering. This type of steering behavior is particularly desirable at higher speeds on the open road. When the steering axle of the dolly is steered in the opposite direction to the above, the dolly and the trailer that it carries are caused to swing wider around the corner, producing better maneuverability characteristics for the system as a whole. This mode of steering could be called the cornering type of ratio steering. This type of steering is particularly useful when maneuvering among obstacles or along curved streets at lower speeds.

These methods for automatically steering rear sections of articulated vehicles have all been based on a single basic algorithm: a certain angle change of the section in front of the steered section results in a certain change in the angle of the steering axle. This type of steering can be called "ratio steering". In the mode in which the wheels are steered in the opposite direction as the section in front, a certain change in angle results in a change in the opposite direction, roughly corresponding to a ratio of 1:−1 (one-to-minus-one). In general, as the ratio proceeds in the negative direction, i.e. 1:−5, 1:−10, 1:−50, the turning radius is decreased. A type B dolly has a ratio corresponding to 1:negative infinity, causing an immediate extreme correction in the direction of rotation. As the ratio becomes more positive, the system becomes generally less maneuverable, with an increasing turning radius. A ratio of 1:0 corresponds to a standard a type A dolly. As the ratio increases toward 1:1, the system emulates a trailer with an increasingly long wheelbase. A mode in which the wheels turn in the same direction as the front section and have a ratio of 1:1 induces a crab type motion in which the entire system translates horizontally, but is incapable of changing direction. As the ration becomes greater, the trailer becomes unusable, with the rear trailer turning more than the front. Several patents have explored some of the possibilities for this type of ratio steering.

SUMMARY OF THE INVENTION

The present invention makes several contributions and extensions to the art of ratio steering for articulated vehicles, and particularly for dollies used in over-the-road freight transport. First, the present invention provides a method whereby the ratio to be used can be selected automatically by the software in the controlling microprocessor based on parameters such as vehicle turning angle or vehicle speed. At high speeds on relatively straight roads, the dolly operates in modes with positive steering ratios that are characterized by stability with rearward amplification substantially eliminated. When negotiating sharper turns at lower speeds, the dolly automatically switches to the cornering modes (negative steering ratios) that cause the dolly to swing wider around corners. These modes allow the dolly to maximize its maneuverability at low speeds. At intermediate speeds, a steering ratio will be chosen that is the best compromise of stability and maneuverability at that speed.

Second, the present invention provides for one or more additional corrections to the steering at a point later in the turn when the cornering type of ratio steering is ineffective. The overarching purpose here is to "correct" the path of the steered dolly so that it follows as close as possible the path taken by the tractor as it turned the corner. If the tongue of the dolly is long enough, these "oversteer corrections" will indeed allow the steering axle of the dolly to approximate a path that a tractor driver might take as he oversteers around the corner. In this case, then, the trailer carried by the dolly rounds the corner on a path that is reasonably close to the path taken by the first trailer. With this correction, the dolly that is an embodiment of the present invention substantially exceeds the cornering capabilities of the Type B dollies while maintaining superior stability when operating at higher speed on the open road.

All steering modes used by the present invention conform to a type of modified Ackerman geometry.

Figure 1:
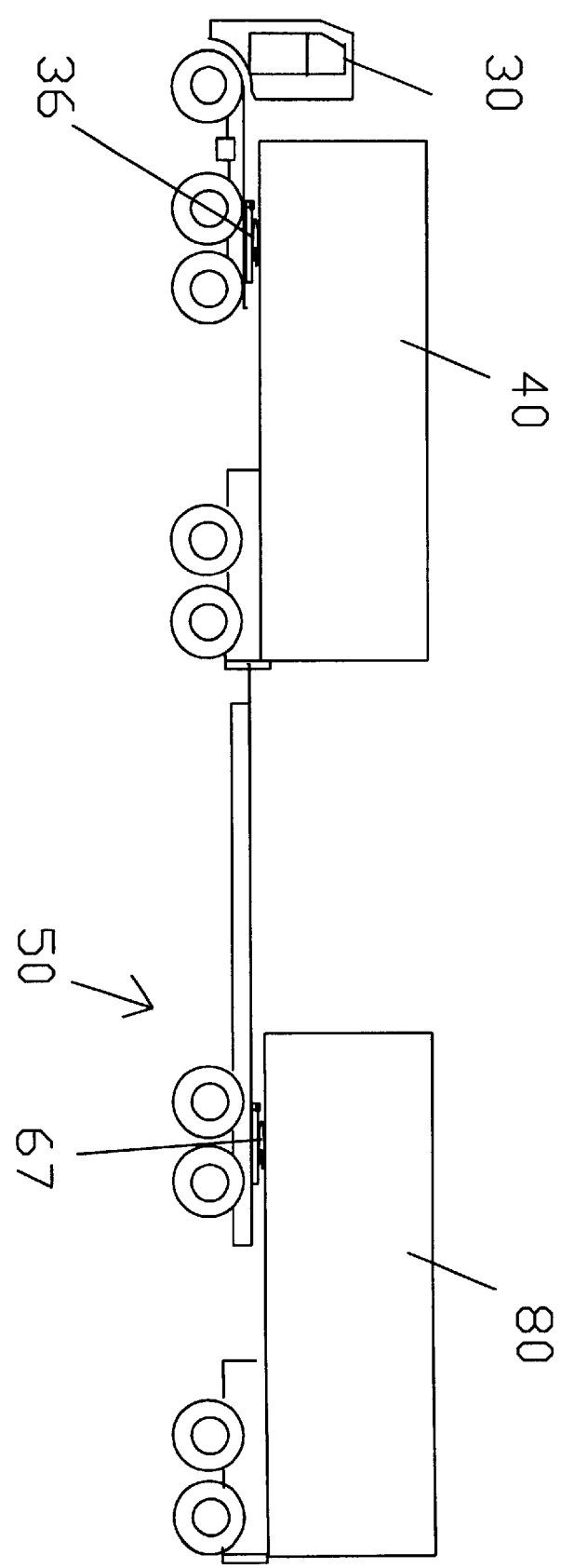
FIG. 1 is a diagrammatic view of an embodiment of a Variable Steering Ratio Digital Dolly with Oversteer Towed behind a Tractor-Trailer Combination Rig

LIST OF REFERENCE NUMBERS 30 tractor
36 fifth wheel
40 front trailer
44 sensor THETA_D1
47 attachment assembly
49 controller
50 dolly
53 sensor THETA_S1
55 tongue
58 axle central pivot support
60 steering axle assembly
63 L, R hydraulic tanks
64 circular bearing plates
65 trailer mounting bar pivot
66 trailer mounting bar
67 fifth wheel
68 hydraulic motor
69 chain
70 L, R running wheels
71 L, R running wheels
72 F, B transverse axles
73 track attachment plate and assembly
74 steering sprocket
75 rear lower partial-circular track
76 power output sprocket
77 sprocket
80 rear trailer
81 sensor THETA_R1
97 shaft
98 shaft
100 forward partial-circular track
104 roller
105 roller
106 L, R hinge assemblies
107 bar
108 ball and socket attachment
110 roller
111 gear
112 angle gear
113 angle gear
114 shaft
115 main gearbox
118 gear
119 angle gear
120 angle gear
121 roller
122 shaft
123 roller
124 gear
125 neutral lock gearbox
126 trailer orientation shaft
127 angle gear
128 angle gear
129 shaft
130 oversteer gearbox
131 square hitch shaft
132 forward enabling switch
133 bearing plates
134 bearing plates
140 rear upper partial-circular track
144 joint 146 pin and lock set
148 pin and lock set
150 rear enabling switch
151 air valve
152 control box
153 indicator lights
154 stability line
155 chain
156 cornering air line
159 roller
160 bracket
161 drive axle
560 gear
562 gear
564 gear
568 shell
570 gearbox
878 encoders on dolly wheels

DETAILED DESCRIPTION OF PREFERRED EMBODIMENTS

The following description will disclose four distinct preferred embodiments of the invention. These four distinct embodiments are as follows:

1. A digital embodiment with an oversteer correction capability, as seen in FIG. 1, 2, 3, 4, 5.

The name we will use for this embodiment is the Variable-Steering-Ratio Digital Dolly with Oversteer. We have called it Variable Steering Ratio because it varies in a continuous manner among a wide variety of distinct steering ratios as a continuous function of vehicle speed. It can be designed to vary among distinct steering ratios as a function of any available parameter such as turning angle, speed, etc. if desired. This embodiment of the invention also provides the capability for oversteer correction.

Figure 6:
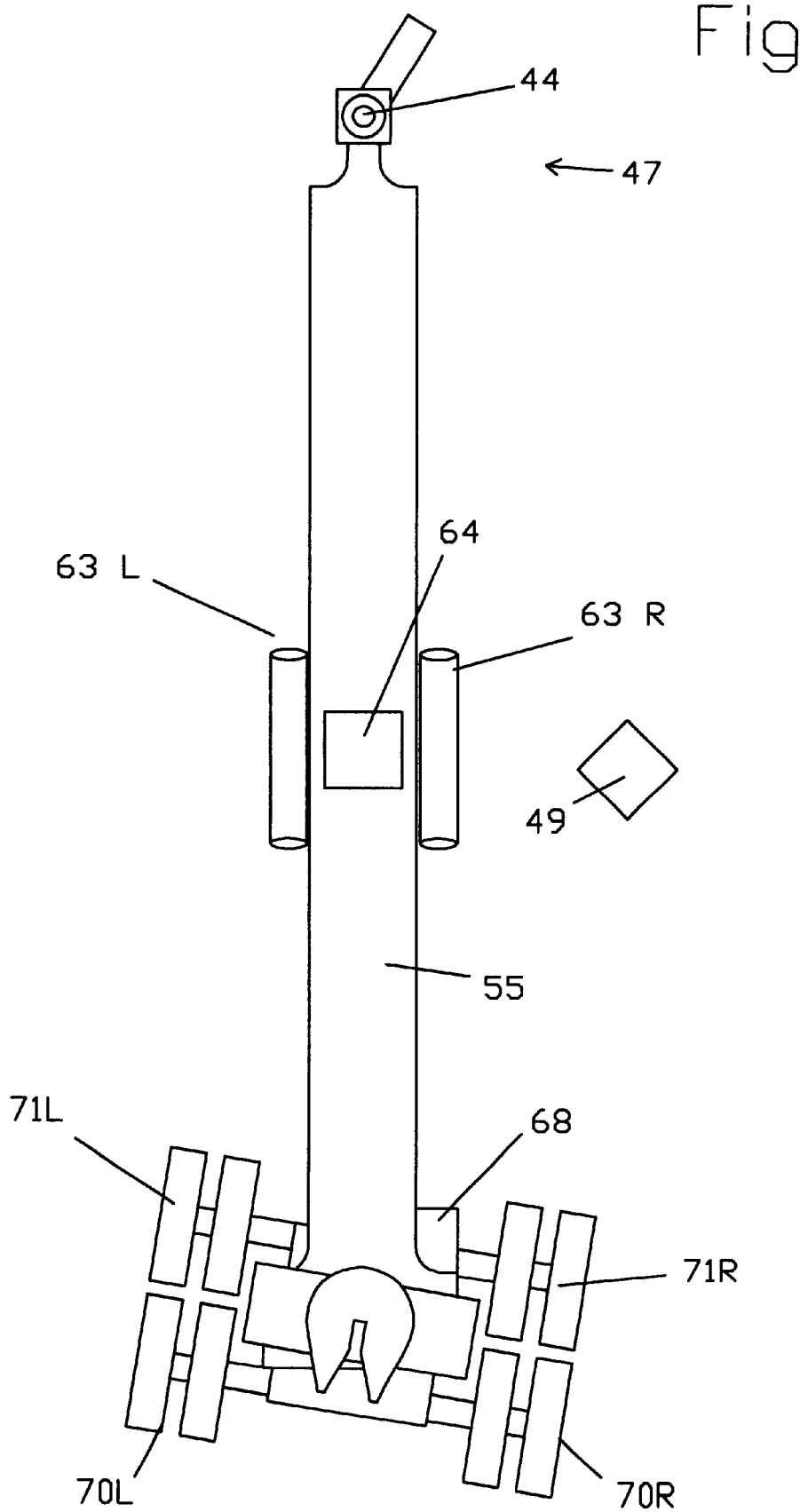
FIG. 6 is a diagrammatic view of a Variable Steering Ratio Digital Dolly without the Oversteer Correction

2. A digital embodiment without an oversteer correction capability, as seen in FIG. 6.

The name we will use for this embodiment is the Variable Steering Ratio Digital Dolly. This embodiment of the invention is the same as embodiment three, except no oversteer correction is available on this embodiment of the invention.

Figure 7:
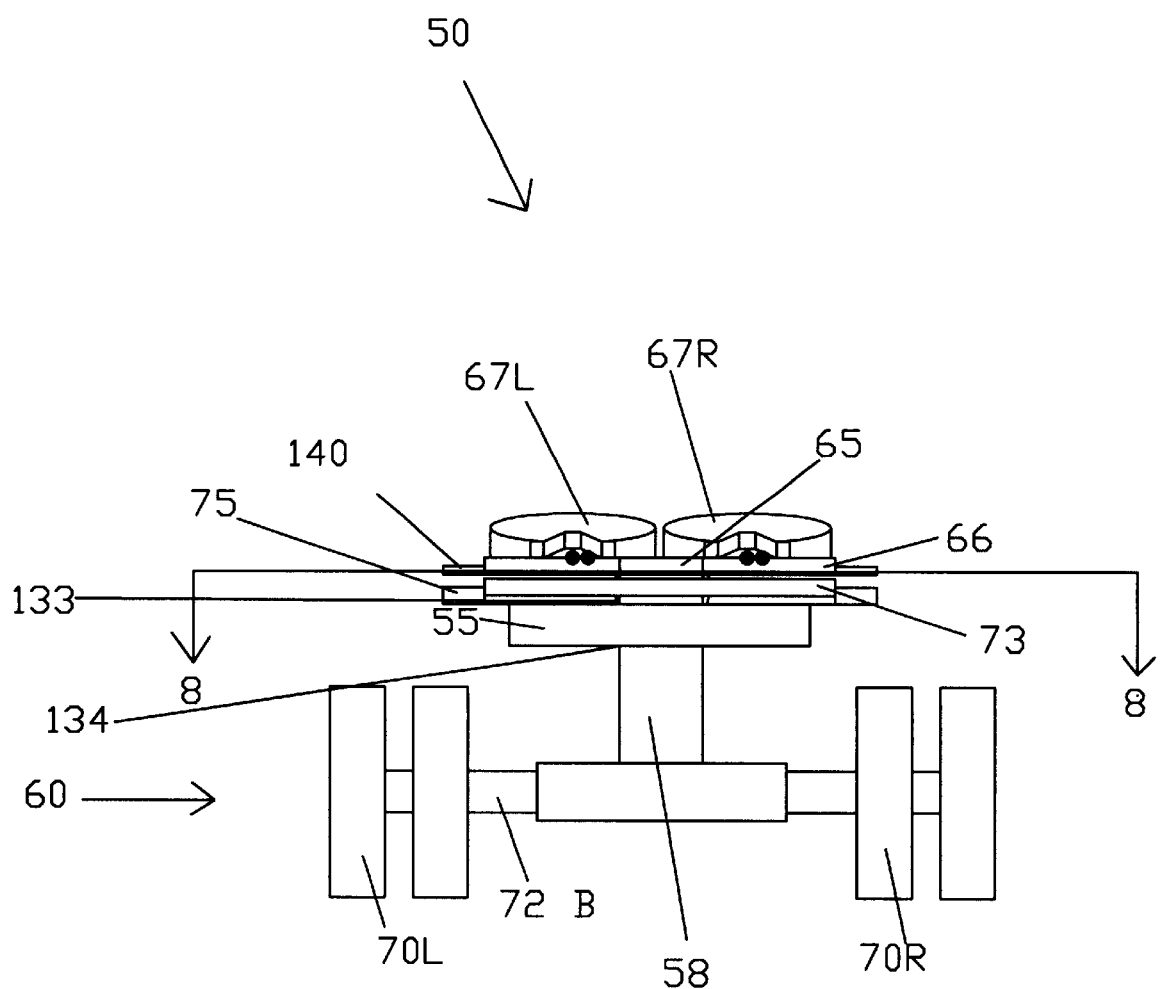
FIG. 7 is a diagrammatic back plan view of Switchable Steering Ratio Geared Dolly with Oversteer is a top plan view of a of Switchable Steering Ratio Geared Dolly with Oversteer

3. A mechanical embodiment with an oversteer correction capability, as seen in FIG. 7, 8, 9.

The name we will use for this embodiment is the Switchable-Steering-Ratio Geared Dolly with Oversteer. We have called it Switchable Steering Geared Ratio because it switches between at least two distinct steering ratios using a mechanical gearbox without stopping the vehicle. It can be designed to switch among any number of distinct steering ratios if desired. Oversteer is the additional correction added to the steering method that, for negative steering ratios, enables the dolly to swing wider, later in the turn than any type of ratio-type steering can produce. This oversteer correction will be particularly useful for the longer dollies that are needed to spread heavier loads over longer stretches of pavement and to reduce- the columnar loading on bridges.

Figure 11:
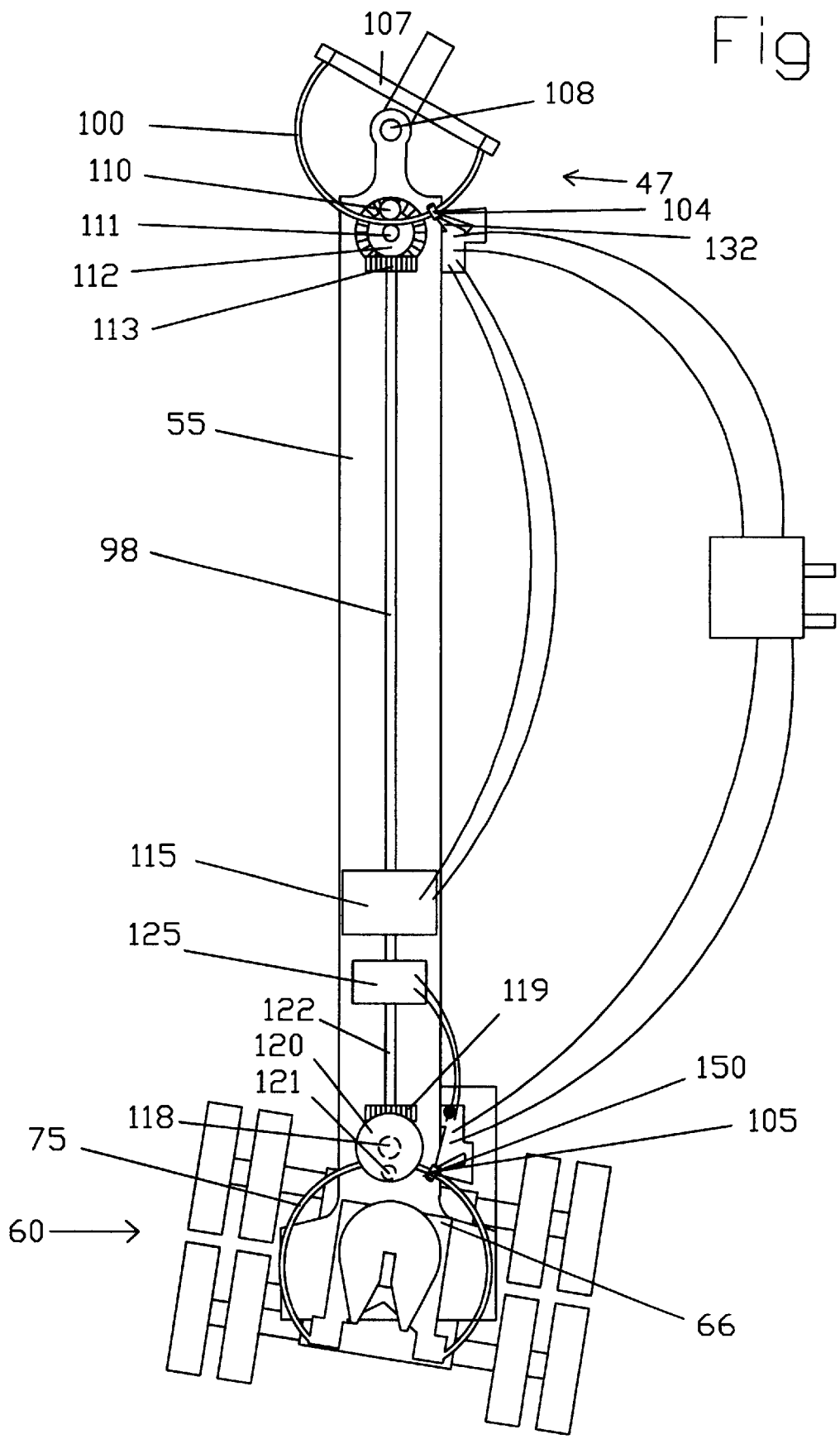
FIG. 11 is a diagrammatic top view of the Switchable Steering Ratio Geared Dolly without the Oversteer Correction

4. A mechanical embodiment without an oversteer correction capability, as seen in FIG. 11.

The name for this embodiment is the Switchable Steering Ratio Geared Dolly. This embodiment of the invention is the same as embodiment one except it has no capability for oversteer correction.

FIG. 1—Variable-Steering-Ratio Digital Dolly with Oversteer Towed behind a Tractor-Trailer Combination Rig FIG. 1 illustrates a typical application of a Variable-Steering-Ratio Digital Dolly with Oversteer 50 that is one of the preferred embodiments of the invention. A tractor 30 of a tractor-trailer combination has a forward trailer 40 coupled thereto via a fifth wheel 36, while a second, rear trailer 80 is coupled to the forward trailer 40 via the dolly 50 we will describe below. The rear trailer 80 is carried via a fifth wheel 67 mounted on the dolly 50.

Overview of Variable Steering Ratio Digital Dolly with Oversteer

This preferred computer-controlled embodiment of the invention as seen in FIG. 1, 2, 3, 4, 5 consists of three pivotally connected sections, and has an equivalent function to the first, mechanical embodiment. The first section, the tongue 55, connects the dolly 50 to the towing vehicle 40. Mounted above the tongue 55 is a fifth wheel 67 with a trailer orientation sensor THETA_R1 81 for determining the angle between the dolly tongue 55 and the rear trailer 80. The steering axle central pivot support 58 extends up through the tongue 55 from below, and is attached firmly at the bottom to the steering axle assembly 60. The steering axle assembly 60 and the central pivot support pivot 58 with respect to the dolly tongue 55. There is an axle orientation sensor 53 to determine the angle between the tongue 55 and the steering assembly 60, as well as a hydraulic motor 68 able to change the angle between the steering assembly 60 and the dolly tongue 55. At the front of the dolly tongue 55 there is a front pivot orientation sensor 44 which determines the angle between the dolly tongue 55 and the front trailer 40.

Figure 2:
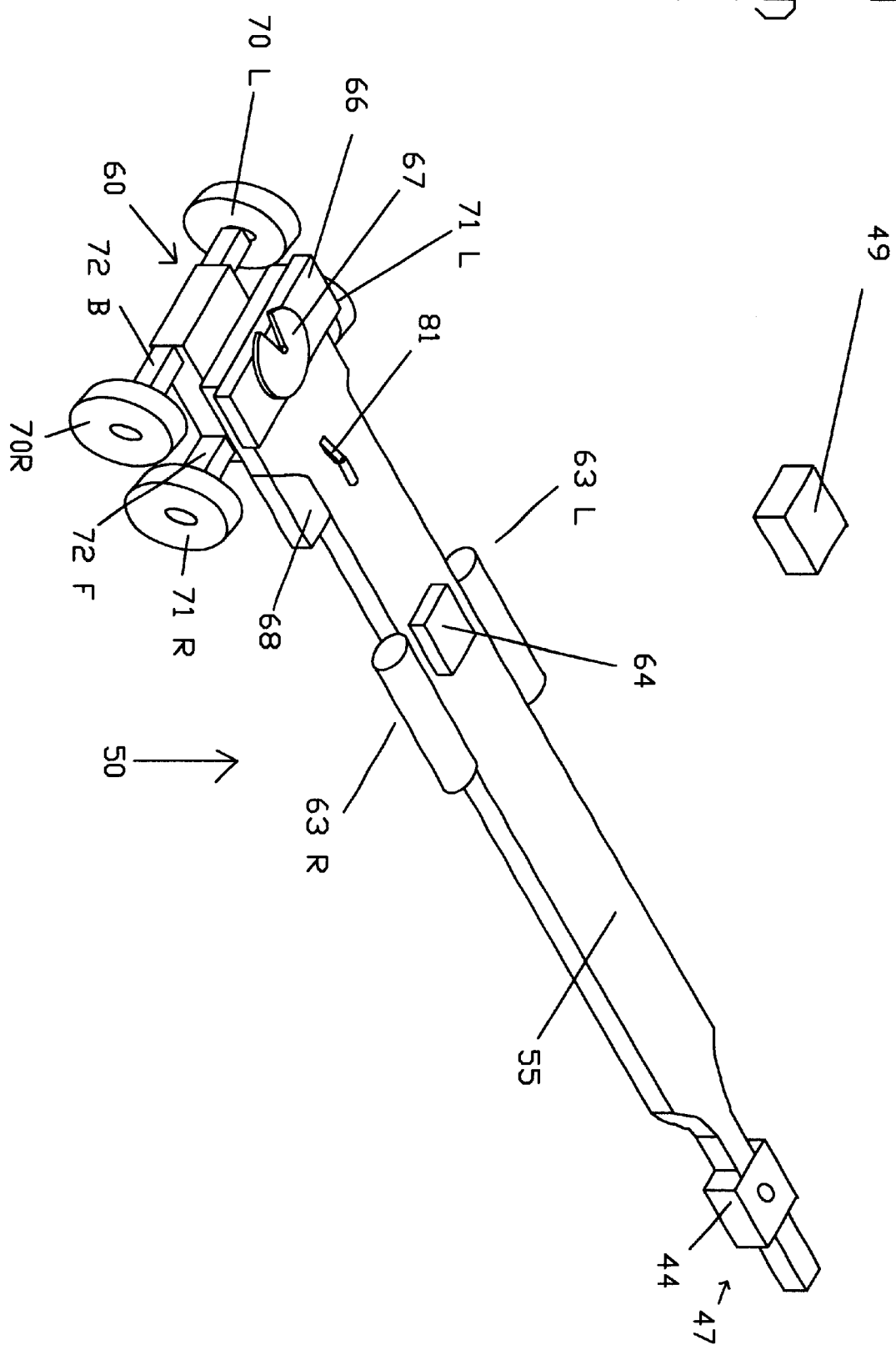
FIG. 2 is a diagrammatic perspective plan view of a Variable Steering Ratio Digital Dolly with Oversteer

FIG. 2—Variable Steering Ratio Digital Dolly with Oversteer in Perspective

FIG. 2 shows the Variable-Steering-Ratio Digital Dolly with Oversteer 50 in a perspective view. Referring to this figure, the dolly 50 has a rigid dolly tongue 55, which in this embodiment will be coupled to the front end of the rear trailer 80 (FIG. 1) via a fifth wheel 67. The fifth wheel 67 is mounted on a trailer mounting bar 66 that is fixed solidly onto the top of the axle assembly central pivot support 58 (FIG. 3) that extends up from below the dolly tongue. A rear trailer orientation sensor, THETA_R1 81, mounted on the dolly tongue just forward of the fifth wheel 67, measures the movement of the rear trailer as it rotates around the fifth wheel latch 67. This sensor is mounted on a roller 159 that rolls along the bottom of the trailer (circling around the kingpin of the trailer) as the trailer rotates. A bracket 160 supports the sensor 81 and the roller 159 and presses them tightly upward against the bottom of the trailer. An air cylinder connected between the dolly tongue and the bracket maintains this upward pressure whenever a kingpin is latched in the fifth wheel latch, but allows the bracket to relax down against the body of the dolly tongue at other times to avoid damage during hitching operations.

The dolly tongue 55 comprises the central rigid structural member below the trailer mounting bar 66 and pivots around the axle assembly central pivot support 58 (FIG. 3) as torque is applied by the hydraulic steering motor 68 at the direction of the controller 49. The hydraulic steering motor 68 receives high pressure hydraulic fluid from the high pressure hydraulic tank 63L in which hydraulic fluid is separated from highly compressed gasses by a diaphragm of some sort. The hydraulic fluid is discharged to the low pressure hydraulic tank 63R. An air motor turns a hydraulic pump 64 to replenish the high pressure hydraulic tank 63L as needed.

Underneath the back section of the dolly 50 is a transverse steering axle assembly 60, on which is solidly mounted the axle assembly central pivot support 58 (FIG. 3) that supports the upper portions of the dolly. Two spaced pairs of running wheels 70 L, R and 71 L, R are mounted on each of the transverse axles 72F (Front) and 72B (Back) by any conventional suspension system. In this embodiment the suspension system is omitted for clarity of illustration since it is a standard assembly. The hydraulic motor 68 that controls the steering of the transverse axles 72F and 72B, is mounted on the right side of the dolly tongue 55 and somewhat in front of the steering axle assembly 60.

The hitch pivot attachment assembly 47 with its front pivot orientation sensor THETA_D1 44 is located near the front of the dolly tongue 55.

Figure 3:
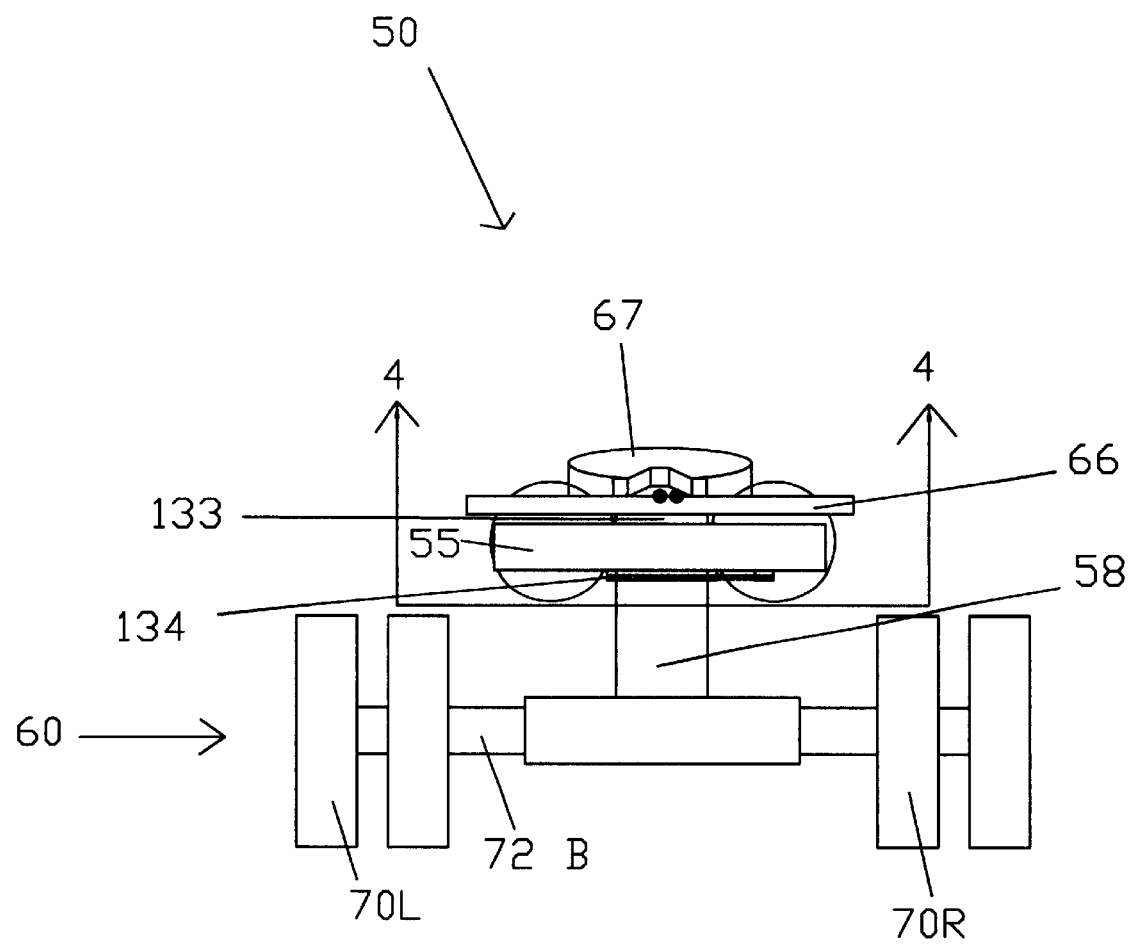
FIG. 3 is a diagrammatic back plan view of a Variable Steering Ratio Digital Dolly with Oversteer

FIG. 3—View of Variable-Steering-Ratio Digital Dolly with Oversteer from the Back Looking Forward FIG. 3 shows a view of the back of the Variable-Steering-Ratio Digital Dolly with Oversteer. The heavy axle central pivot support 58 is mounted solidly on the steering axle assembly 60 and extends upward through the center of the dolly tongue 55. The dolly tongue 55 pivots freely around this axle central pivot support 58 and is stabilized there by bearing plates 134. Thus, the steering axle assembly 60 including the transverse axles 72 F, 72 B are allowed to pivot with respect to the dolly tongue 55 in response to the torque applied by the hydraulic steering motor and the steering chain (FIG. 4).

The top section of the axle central pivot support 58 extends upward through the center of the dolly tongue 55. A heavy trailer mounting bar 66 is solidly attached to this axle central pivot support 58, and supports the fifth wheel 67. The kingpin of the rear trailer 80 (FIG. 1) is allowed to pivot above the fifth wheel 67 with respect to the dolly tongue 55 as the rear trailer 80 (FIG. 1) swings from side to side with respect to the dolly 50, but this orientation of the trailer 80 (FIG. 1) with respect to the dolly 50 is accurately measured by the trailer orientation sensor assembly which measures the rotation of the kingpin of the rear trailer 80 inside the fifth wheel latch assembly.

Figure 4:
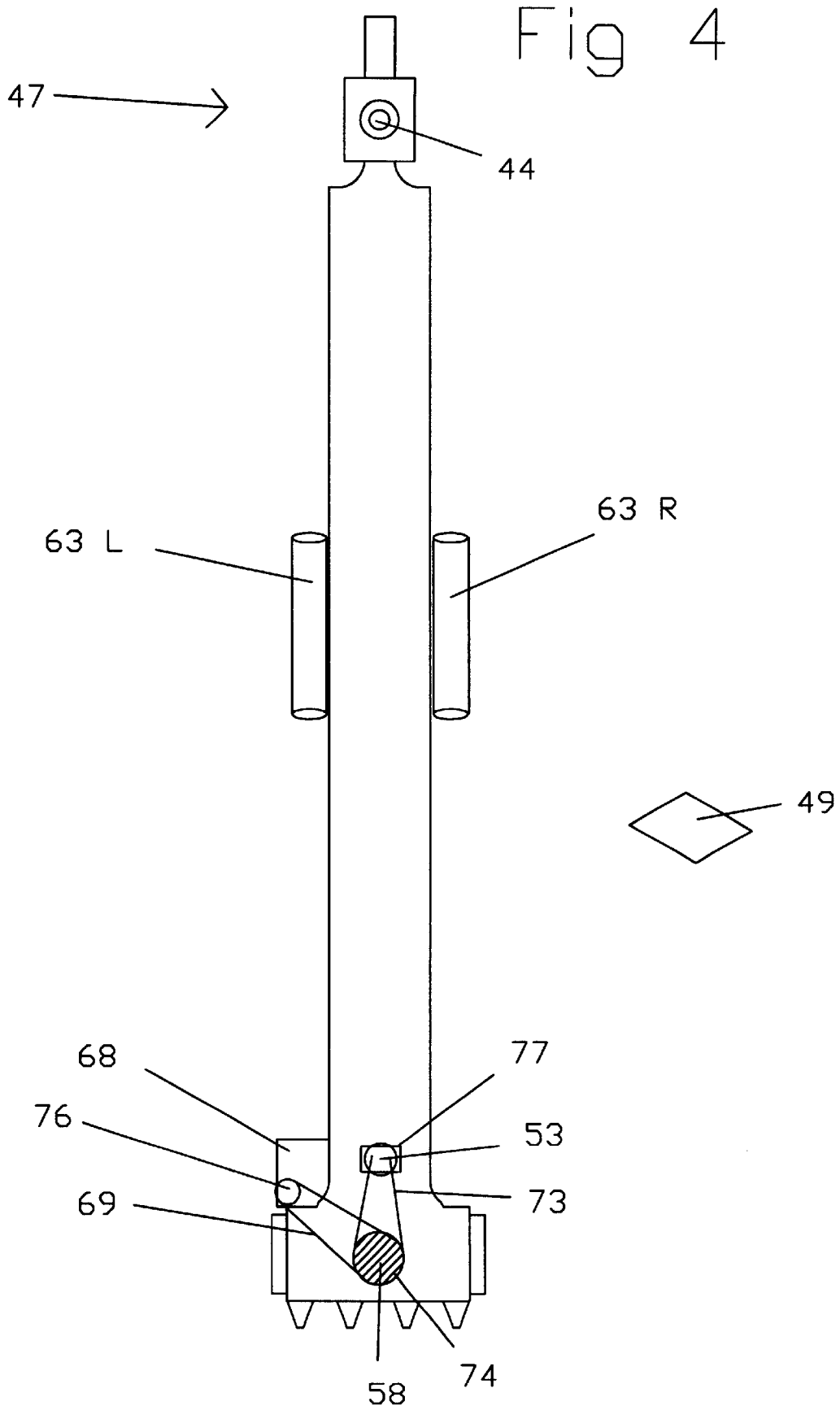
FIG. 4 is a diagrammatic bottom view taken along lines 4—4 of FIG. 3 of a of a Variable Steering Ratio Digital Dolly with Oversteer

FIG. 4—Variable-Steering-Ratio Digital Dolly with Oversteer Viewed Looking Upward from a Cut Just Below the Tongue The view of the Variable-Steering-Ratio Digital Dolly with Oversteer shown in FIG. 4 shows more clearly the arrangement of the hydraulic steering motor 68 and the axle orientation sensor assembly 53. The hydraulic steering motor 68 is mounted solidly on the tongue 55 of the dolly. A heavy steering chain 69 extends between the power output sprocket 76 of the hydraulic steering motor assembly 68 and a steering sprocket 74 that is attached solidly to the steering axle central pivot support 58 (shown here as a cut). The rotation of the power output sprocket 76 and the steering chain 69 then forces the rotation of the steering axle assembly (not shown—located in 3-D space between the viewer and the diagram) with respect to the dolly tongue 55.

A second, smaller sprocket is attached to the steering axle central pivot support 58 for determining orientation data. A smaller chain 155 extends from this sprocket 58 to the sprocket 77 on the axle orientation sensor 53. Any movement of the steering axle assembly 60 (FIG. 3) with respect to the dolly tongue 55 is transferred to and accurately measured by this axle orientation sensor 53, and this orientation data is then transferred to the controller 49 for use in steering the dolly.

Figure 5:
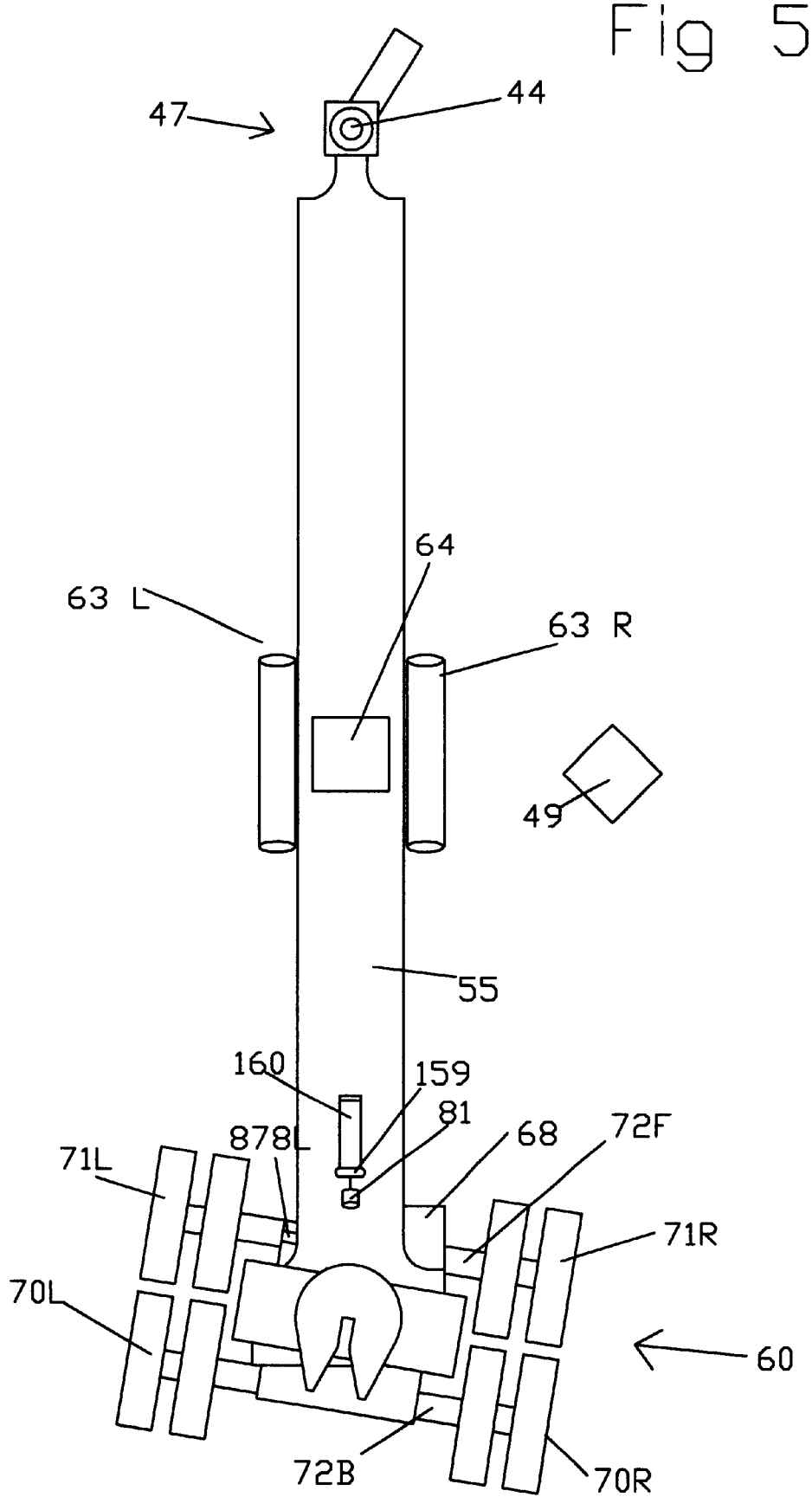
FIG. 5 is a diagrammatic top view of a Variable Steering Ratio Digital Dolly with Oversteer Utilizing a Controller for Steering the Dolly

FIG. 5—Variable-Steering-Ratio Digital Dolly with Oversteer Viewed from Above The Variable-Steering-Ratio Digital Dolly with Oversteer shown in FIG. 5 is a preferred embodiment of the invention. It is similar to the Switchable-Steering-Ratio Geared Dolly with Oversteer except that controller 49 is used to transfer information. The steering information and the oversteer information are transferred from the steering input section, the axle orientation system and the trailer orientation system, respectively, to the powered steering system of the dolly 50 by controller 49. An additional source of oversteer information will also be available in the form of a measurement of the differential rotation of the dolly wheels 71 L, R as measured by the travel distance encoders 878a, b. If this difference is accumulated and then decayed at a prescribed rate per linear foot of travel, it can be used along with or instead of the oversteer information received from the trailer orientation system. Pressurized hydraulic fluid is utilized as an energy source. The software in controller 49 will be able to adjust the amount of oversteer as needed, and will also vary the steering ratio continuously as the speed of the dolly changes so that no gearbox will be required. Full redundancy is recommended for all the electronic components to minimize the consequences of failures, but full redundancy is not included in this embodiment of the invention.

At the front of the dolly 50, an optical pulse rotation encoder, front pivot orientation sensor THETA_D1 44, (or some other such sensor) will record the rotation of the dolly tongue 55 about the forward pivot point and transfer this information via pulse counting circuit to the controller 49. At the rear of the dolly 50 another optical pulse rotation encoder, axle orientation sensor THETA_S1 53 (FIG. 4), (or some other such sensor) will record the rotation of the steering axle assembly 60. A third optical pulse rotation encoder (or some other such sensor), rear trailer orientation sensor, THETA_R1 81, mounted on the dolly tongue just forward of the fifth wheel 67, measures the movement of the trailer 80 carried by the dolly as it rotates around the fifth wheel latch 67, to provide input to the oversteer correction algorithms. This sensor is mounted on a roller 159 that rolls along the bottom of the trailer (circling around the kingpin of the trailer) as the trailer rotates. A bracket 160 supports the sensor 81 and the roller 159 and presses them tightly upward against the bottom of the trailer. An air cylinder connected between the dolly tongue and the bracket maintains this upward pressure whenever a kingpin is latched in the fifth wheel latch, but allows the bracket to relax down against the body of the dolly tongue at other times to avoid damage during hitching operations.

Some appropriate method must be provided for scaling the readings of these sensors into degrees of rotation and to calibrate them periodically to assure that any shifting is taken into account.

A reversible hydraulic motor 68 geared down to a moderate speed will provide the energy for turning the axles 72 F, 72 B when the software detects that movement is required. This hydraulic motor 68 is provided with an automatic braking mechanism that locks the gear train into position at times when no action is required of the hydraulic motor 68. Loss of air pressure will also activate the braking mechanism.

An optical rotation encoder 878 (or other such sensor) will record the rotation of the drive shaft for each front dolly wheel 71 L, R. The software in the controller 49 will use this information in two ways. The sum of the counts will be scaled to yield the distance traveled by the dolly in any given time interval. The difference between the counts for the two wheels 71 L, R will be scaled to yield a measure of the amount of cornering that the dolly wheels 71 L, R are undergoing.

Overview of the Variable-Steering-Ratio Digital Dolly without Oversteer

In this alternate embodiment of the invention, as seen in FIG. 6, a controller 49 controls the switching among a multitude of steering ratios. The dolly consists of two sections that pivot in relation to one another. The upper section, the dolly tongue 55, is connected at the front to the front trailer 40 by an attachment assembly 47, and at the back to the rear trailer 80 via a fifth wheel 67. Below the dolly tongue 50 is a steering axle assembly 60, which pivots with respect to the dolly tongue 55. There is a front pivot orientation sensor THETA_D1 44 between the dolly tongue 55 and the front trailer 40 that detects the angle between the centerline of the front trailer 40 and the center line of the dolly tongue 50. Another sensor, the axle orientation sensor 53, is located between the dolly tongue 55 and the steering axle assembly 60, which detects the angle between the centerline of the dolly tongue 55 and the centerline of the steering axle assembly 60. The controller 49 reads the input from the front sensor and generates an appropriate steering angle for the steering axle assembly 60. A hydraulic motor 68 is mounted so that it can rotate the steering axle assembly 60 to the desired steering angle.

FIG. 6: The Variable-Steering-Ratio Digital Dolly without the Oversteer Correction This alternate embodiment of the invention is physically identical to the Variable-Steering-Ratio Digital Dolly with oversteer if we omit the sections relating to the measurement of the trailer orientation, the sections relating to the measurement of the rotation of the dolly wheels, and the sections relating to the oversteer algorithms in the controller. There will be no sensor to measure the rotation of the trailer kingpin inside the fifth wheel latch. There will, of course, be no sensors to measure the rotation of the dolly wheels. There will be no algorithms in the computer software to apply any oversteer correction. The remainder of the dolly will be unchanged.

For a detailed description of this alternate embodiment of the invention, simply refer to the detailed description of the Variable-Steering-Ratio Digital Dolly with oversteer, and make allowance for the above differences.

Overview of Switchable-Steering-Ratio Geared Dolly with Oversteer (Best seen in FIGS. 7, 8, 9, and 10)

This preferred mechanical embodiment of the invention consists of three pivotally connected sections. At the front of the dolly tongue 55 there is a front partial-circular track 75, which is connected at the sides to a hitch bar 131 that pivots with the front trailer 40 (FIG. 1). As the front trailer 40 (FIG. 1) rotates with regard to the dolly tongue 55, the front partial-circular track 100 passes between the roller 110 and the gear 111. The outside of the front partial-circular track 100 has teeth sized to mesh with the gear 111, therefore as the front partial-circular track 100 rotates the gear 111 also rotates. Mounted below the gear 111 is an angle gear 112, which meshes with another angle gear 113 to transfer the rotation to a horizontal plane. The angle gear 113 is connected to a shaft 114 that carries the rotation to a gearbox 115. There is a roller 104 mounted on the front partial-circular track 100 which activates an enabling air valve 132 when the front trailer 40 (FIG. 1) and dolly tongue 55 are aligned. The enabling air valve 132 sends a signal to the gear box 115 indicating that the sections are aligned.

Figure 8:
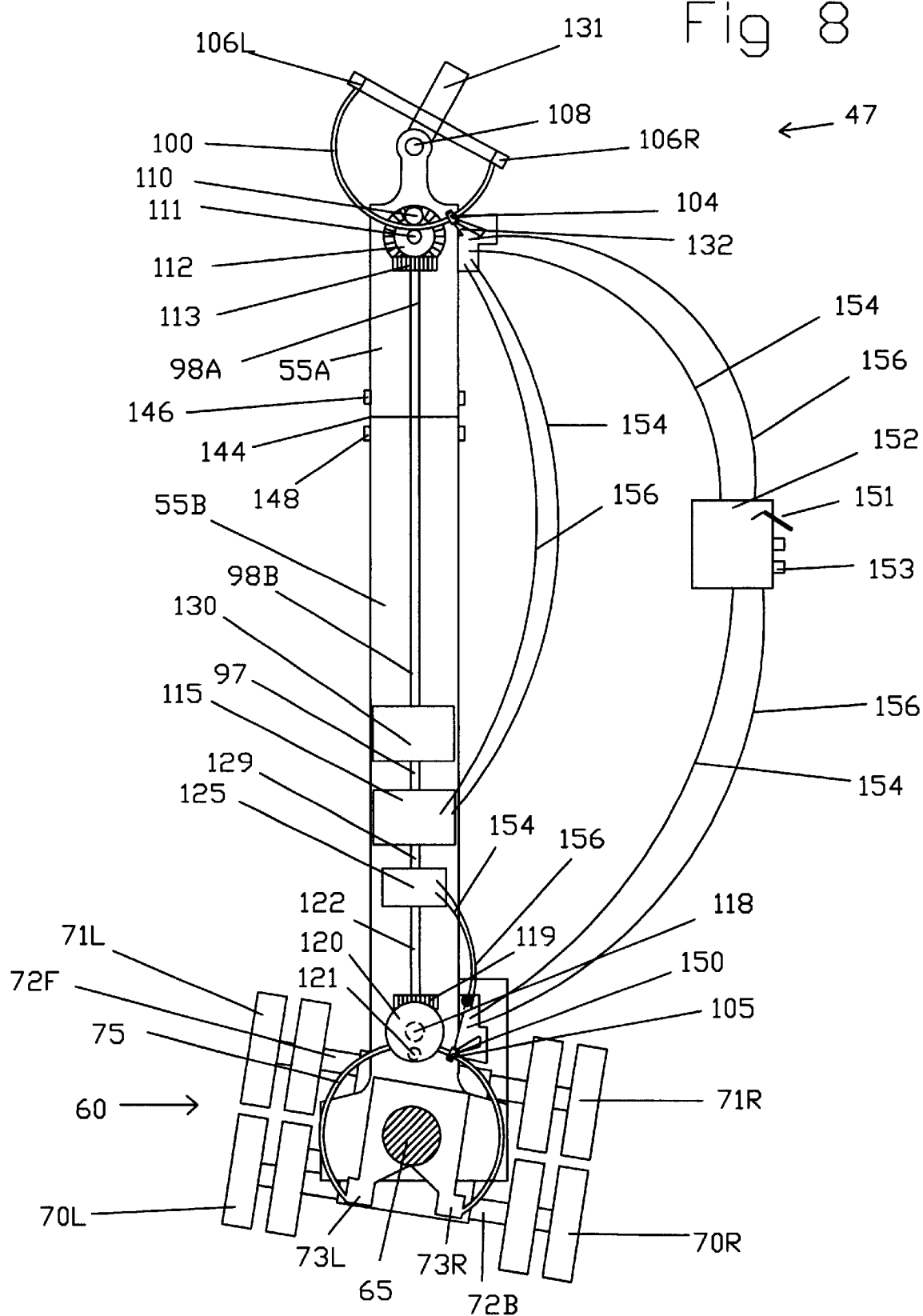
FIG. 8 is a diagrammatic top plan view taken along lines 8—8 of FIG. 7 of a of Switchable Steering Ratio Geared Dolly with Oversteer

There are two partial-circular tracks at the rear of the dolly tongue, one above the other. The lower rear partial-circular track 75, best seen in FIG. 8, is connected to the steering axle assembly 60 via the track attachment plate and assembly 73, and the steering axle central pivot support 58, and has a gear 118 (hidden) and roller 121 (hidden) like the front partial-circular track 75. Above the gear 118 (hidden) is an angle gear 120 that meshes with an angle gear 119 connected to a shaft 122, which goes into the neutral-lock gearbox 125. There is a roller, as in the front track, with an enabling air valve that signals the neutral-lock gearbox 125 that the dolly tongue 55 and the axle assembly 60 are aligned.

The rear trailer is not mounted on a single fifth wheel, but on a double fifth wheel 67 L, R on a trailer mounting bar 66 that pivots above the dolly tongue 55. Attached to the trailer mounting bar 66 is an upper rear partial-circular track 140 which rotates in an equivalent assembly, consisting of a roller 123 (hidden by angle gear 127, gear 124 (hidden by angle gear 127), angle gear 127, angle gear 128 and shaft 126 passing above the other two gearboxes 125, 115, leading to the oversteer gearbox 130.

FIG. 7—View of Switchable-Steering-Ratio Geared Dolly with Oversteer from the Back Looking Forward FIG. 7 shows a view of the back of the Switchable-Steering-Ratio Geared Dolly with Oversteer. The heavy axle central pivot support 58 is mounted solidly on the steering axle assembly 60 and extends upward through the center of the dolly tongue 55. The dolly tongue 55 pivots freely around this axle central pivot support 58 and is stabilized there by bearing plates 134. Thus, the steering axle assembly 60 including the transverse axles 72 F, 72 B are allowed to pivot with respect to the dolly tongue 55 in response to the torque applied by the lower rear partial-circular track 75 (FIG. 8).

The top section of the axle central pivot support 58 extends upward through the center of the dolly tongue 55. A heavy trailer mounting bar central pivot 65 that is attached to this axle central pivot support 58 supports and allows pivoting of the trailer mounting bar 66 with the two fifth wheels 67 L, R. Circular bearing plates 134 provide stability for this trailer mounting bar central pivot 65. The rear upper partial-circular track 140 (FIG. 9) attaches solidly to the trailer mounting bar 66 so that as the trailer mounting bar 66 rotates with the rotation of the rear trailer 80, the upper partial-circular track 140 is also forced to rotate. The rotation of the upper partial-circular track 140 causes the gears in the trailer rotation gear train to rotate, providing the oversteer input for the oversteer gearbox 130 (FIG. 8). Thus, the trailer mounting bar 66 and the rear trailer 80 (FIG. 1) are allowed to pivot above the dolly tongue 55 as the rear trailer 80 (FIG. 1) swings from side to side with respect to the dolly 50, but this orientation of the trailer 80 (FIG 1) with respect to the dolly 50 is accurately measured by the upper partial-circular track 140 and its associated gearing.

FIG. 8—View of Switchable-Steering-Ratio Geared Dolly with Oversteer from Top Looking Down FIG. 8 shows a view from above of the primary sections of the Switchable-Steering-Ratio Geared Dolly with Oversteer with the upper rear partial-circular track 140 and associated fifth wheel 67 and trailer mounting bar 66 removed. This same figure is shown in its entirety in FIG. 9. The steering gear ratio used by this dolly 50 can be switched from the driver's cab without stopping the vehicle. The switchability of the steering system of this dolly 50 allows it to be operated in a geared stability mode at higher speeds on the open road, then shifted into a different mode to operate as a geared cornering mode dolly 50 for better cornering ability at lower speeds. In the geared cornering mode, an oversteer correction is used to assist in swinging wide around corners.

As seen in FIG. 7, the axle central pivot support 58 extends upward through the dolly tongue 55 and, at a point just above the dolly tongue 55, has an attachment plate extending outward. This attachment plate is connected via track attachment assemblies track attachment plate and assembly 73 to the extremities of a large lower rear partial-circular track 75. The lower partial-circular track 75 must be somewhat longer than a semicircle, since turns of more than 90 degrees will require more than a full 180 degrees of rotation. The bottom of the lower rear partial-circular track 75 is in the same plane with the top of the dolly tongue 55. The gear teeth on the front of the lower rear partial-circular track 75 are sized to mesh with the teeth of a small gear 118 (hidden) mounted on the dolly tongue 55. This lower rear partial-circular track 75 passes between a roller 121 (hidden) and the small gear 118 (hidden) on the top of the main axial member of the dolly tongue 55. The roller 121 (hidden) and the gear 118 (hidden) are positioned to press tightly against the sides of the lower rear partial-circular track 75 so that as the gear 118 (hidden) rotates, it causes the lower rear partial-circular track 75 to move between the gear 118 (hidden) and the roller 121 (hidden). This in turn will cause the axles 72 F, 72 B to rotate about a vertical axis, changing the orientation of the dolly running wheels 70 L, R, and 71 L, R. The small gear 118 (hidden) is rigidly attached to a large 90-degree gear 120 above it, both of which rotate about the same axis. The large 90-degree gear 120 is mounted high enough to easily stay clear of the lower rear partial-circular track 75 as it moves. The large 90-degree gear 120 has 45 degree teeth along its outer lower edge designed to mesh with a smaller 90-degree gear 119 rotating at a 90-degree angle to it and located directly below its front edge. This smaller 90-degree gear 119 which is rotating around an axis parallel to the main axial member of the dolly tongue 55 is mounted on a shaft 122.

The shaft 122 enters a neutral-lock gearbox 125 through the back wall of the neutral-lock gearbox 125. This neutral-lock gearbox 125 performs its functions at the beginning and at the end of each shifting sequence. It starts each mode shifting sequence by disconnecting all steering gears in front of the neutral-lock gearbox 125 from all steering gears behind it and then locking the gears behind it into a static position. Then after all other shifting operations are completed, and when a forward enabling air valve 132 indicates that the forward section is aligned, the neutral-lock gearbox 125 completes the sequence by unlocking and reconnecting the gears behind it to the gears in front of it. Since no shifting sequence can begin unless a rear enabling air valve 150 has indicated that the rear section is in alignment, this method assures that at the completion of each shifting sequence, all sections are properly aligned and centered. The operation of this rear enabling air valve 150 will be dealt with more fully later on in this section. In practice, of course, all these events may take place in a very short interval of time, since all the actions are automatically controlled by air pressure.

A shaft 129 coming out through the front wall of the neutral-lock gearbox 125 goes through another wall and into the main gearbox 115. The purpose of this main gearbox 115 is to select the dolly operating mode by changing the ratio and/or the direction of the rotational input from a front shaft 97 to a new output rotation of the rear shaft 129. A detailed discussion of this operation will be presented in the operation section, however we will summarize the specifications here which would be needed when ordering this gearbox from a manufacturer.

When ordering the gearbox, the following requirements will-need to be specified. All gear shifting should be performed by high-pressure air. All gear positions should be stable; i. e. no changes in gear position can occur if no high-pressure air is applied to the system. The input rotation enters the front of the box, and two gear ratios must be available to the shaft 129 coming out the back. The gear shifting should be performed by only two high-pressure airlines. Pressure on the first air line, which we will call the stability air line 154, should cause the output rotation to be shifted to straight or forward, with the magnitude of the gear ratio being equal to the value calculated in the theory section for Stability mode. This gear ratio will depend on the relative lengths of the dolly 50 and the rear trailer 80 (FIG. 1), but will in general be around 0.75. Pressure on the second airline, which we will call the cornering airline 156 should cause the output rotation to be shifted to reversed with a gear ratio of –1 (–1 rotation out to the back/one rotation in from the front).

In addition to the gearing requirements, the main gearbox 115 will provide some control and information functions. The main gearbox 115 must activate switches when in a particular mode which will show the main gearbox 115 status to the driver using indicator lights 153 on a control box 152 in the driver's cab.

When the rear enabling air valve 150 detects alignment, the air pressure is passed on to the neutral-lock gearbox 125 and the mode switching operation is initiated. When the forward enabling air valve 132 detects alignment, the air pressure is passed on to the main gearbox 115 to allow completion of the mode switching operation.

The control box 152 will be located in the driver's cab. The face of the control box 152 will have two indicator lights 153, one for each mode. The control box 152 will have an air valve 151 that will be used by the driver to turn on high-pressure air to either the stability airline 154 or the cornering air line 156, but not to both, with the other line in each case dumped to atmosphere. Two high-pressure airlines 154, 156 will be routed between the control box 152 and the dolly 50.

A front shaft 97 comes out the front of the main gearbox 115 and enters through the back wall of the oversteer gearbox 130. This oversteer gearbox 130 also receives rotational input from the trailer orientation shaft 126 (removed in this figure, but shown in the upper view of this figure, FIG. 9). The rotation of the trailer orientation shaft 126 (FIG. 9) is caused by, and is an indicator of, the rotation of the trailer mounting bar 66 and thus of the trailer 80 (FIG. 1) itself around the trailer mounting bar central pivot 65. The rotation of this trailer orientation shaft 126 (FIG. 9) will be added to the rotation coming into the front of the oversteer gearbox 130 and the combined rotations will be output through the back shaft 97 to the main gearbox 115. A detail of this operation will be shown in FIG. 10. A shaft 98*b* coming out the front of the oversteer gearbox 130 is the outer section of a splined shaft 98*a* having splines on the inside. The inner section of the forward-shaft 98*a* having splines on the outside, slides inside the outer splined front shaft 98*b*. These splined shafts 98*a*, 98*b* are designed to allow the length of the dolly tongue 55 to be adjusted as needed for different rear trailer 80 (FIG. 1) lengths. Similarly, at a joint 144, a smaller dolly tongue section 55*b* slides into a larger dolly tongue section 55*a*, allowing the main frame to be easily adjusted. Two pin and lock sets 146 and 148 secure this attachment to prevent slippage or movement during operation. The front end of the splined shaft 98*a* connects to a 90-degree gear 113. The 90-degree gear 113 connects to a larger 90-degree gear 112 in a manner that is similar to the connections to the lower rear partial-circular track 75 except that gear 113 is above gear 112. A smaller gear 111 above 90-degree gear 112 is rigidly attached to 90-degree gear 112 so that its axis coincides with the axis of 90-degree gear 112. This smaller gear 111 then meshes and presses tightly against the back of a forward partial-circular track 100 while a roller 110 rolls tightly against the front or inside of the forward partial-circular track 100. As the forward trailer 40 (FIG. 1) turns, the forward partial-circular track 100 is forced to move between the roller 110 and the gear 111, causing the 90-degree gear 112, and thus the attached linkages to rotate.

A roller 104 is mounted near the forward partial-circular track 100 on a mounting brace. Its mounting brace is attached solidly to the dolly tongue 55 and the roller 104 is positioned to roll along the top of the forward partial-circular track 100 as it moves. When the forward trailer 40 is aligned with the centerline of the dolly, a bump on the top of the forward partial-circular track 100 pushes the roller 104 up, causing the forward enabling air valve 132, which is also mounted on the mounting brace, to be activated. This enabling air valve 132 then passes the air pressure on to the main gearbox 115, enabling the completion of a mode shifting sequence when the driver has signaled for a mode change.

The forward partial-circular track 100 is attached to a hitch assembly 47 at its extremities via some sort of hinge-type attachment that allows some up and down hinging action while preventing vertical or horizontal movement at the point of attachment. In this embodiment, we will use hinge assemblies 106L and 106R to represent the attachment arrangements for the forward partial-circular track 100. The heavy central member of the dolly tongue 55 attaches to a larger attachment point using a larger device that will be represented by ball-and-socket attachment assembly 108. This ball-and-socket attachment assembly 108 must bear the full weight and traction forces of the dolly 50 and the rear trailer 80 while allowing free pivoting around a vertical axis as well as limited movement about horizontal axes. A solidly built square hitch shaft 131 extending forward from the attachment assembly 47 will slide into a receiving hole in the hitching apparatus of the forward trailer 40. The forward trailer 40 (FIG. 1) must be modified to have a receiving hole that is compatible with the dolly hitch shaft 131 and a way of latching the hitch shaft 131 firmly into its receiving hole. Note that the forward partial-circular track 100 is not solidly attached to the dolly tongue 55, but travels across it, in contact with it, during turns. Note also that the ball-and-socket attachment assembly 108 for the main dolly attachment must be positioned in the center of the forward partial-circular track 100 during operation.

Moving toward the back of the dolly, a roller 105 is mounted in a manner similar to the front roller 104. Its mounting brace is attached solidly to the dolly tongue 55 and the roller 105 is positioned to roll along the top of the lower rear partial-circular track 75 as it moves. When the axles 72 F, 72 B are perpendicular to the dolly tongue 55, a bump on the top of the lower rear partial-circular track 75 pushes the roller 105 up, causing the rear enabling air valve 150, which is also mounted on the mounting brace, to be activated. This rear enabling air valve 150 then passes the air pressure on to the neutral-lock gearbox 125, enabling the initiation of a mode shifting sequence when the driver has signaled for a mode change.

Figure 9:
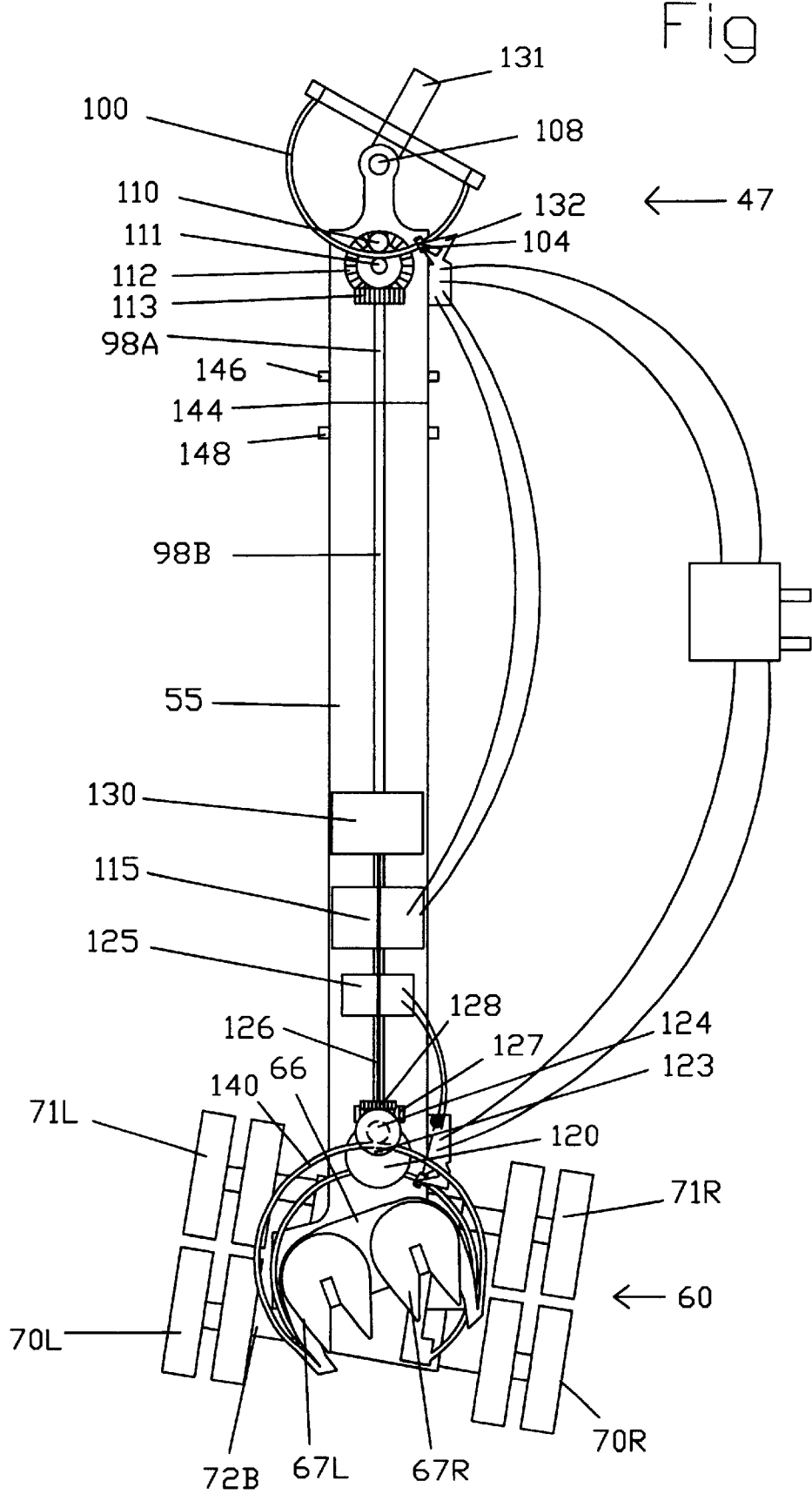
FIG. 9 is a diagrammatic top plan view of Switchable Steering Ratio Geared Dolly with Oversteer showing upper partial-circular track

FIG. 9—Preferred Embodiment of Invention Using a Switchable-Steering-Ratio Geared Dolly with Oversteer (Upper Partial-Circular Track)

The rear trailer 80 is rigidly connected by the two fifth wheels 67L, R to the trailer mounting bar 66. To measure the angle of the rear trailer 80 (FIG. 1) in relation to the centerline of the dolly tongue 55, the ends of the rear upper partial-circular track 140 attach to the trailer mounting bar 66. This rear upper partial-circular track 140 is mounted sufficiently above the lower rear partial-circular track 75 to easily clear it during operation and to allow unobstructed operation of both rotational systems and is also of somewhat greater diameter than the diameter of the lower rear partial-circular track 75. This rear upper partial-circular track 140 passes between a roller 123 and the small gear 124 directly above the main axial member of the dolly tongue 55 and somewhat above the gear 120. The roller 123 and the small gear 124 are positioned to press tightly against the sides of the rear upper partial-circular track 140 so that as the rear upper partial-circular track 140 moves between the gear 123 and the roller 124, the small gear 123 is caused to rotate about its vertical axis. The small gear 123 is rigidly attached to a large 90-degree gear 127 above it, both of which rotate about the same axis. The large 90-degree gear 127 is mounted high enough to easily stay clear of the rear upper partial-circular track 140 as it moves. The large 90-degree gear 127 has 45 degree teeth along its outer lower edge designed to mesh with a smaller 90-degree gear 128 rotating at a 90 degree angle to it and located directly below its front edge. This smaller 90-degree gear 128 which is rotating around an axis parallel to the main axial member of the dolly tongue 55 is mounted on a shaft 126 which passes forward above the neutral-lock gearbox 125 and the main gearbox 115 and into the oversteer gearbox 130. Here its rotation will be combined with the rotational input from the front steering section of the dolly 50 to control the steering of the dolly wheels 71 L, R, 72 L, R.

Figure 10:
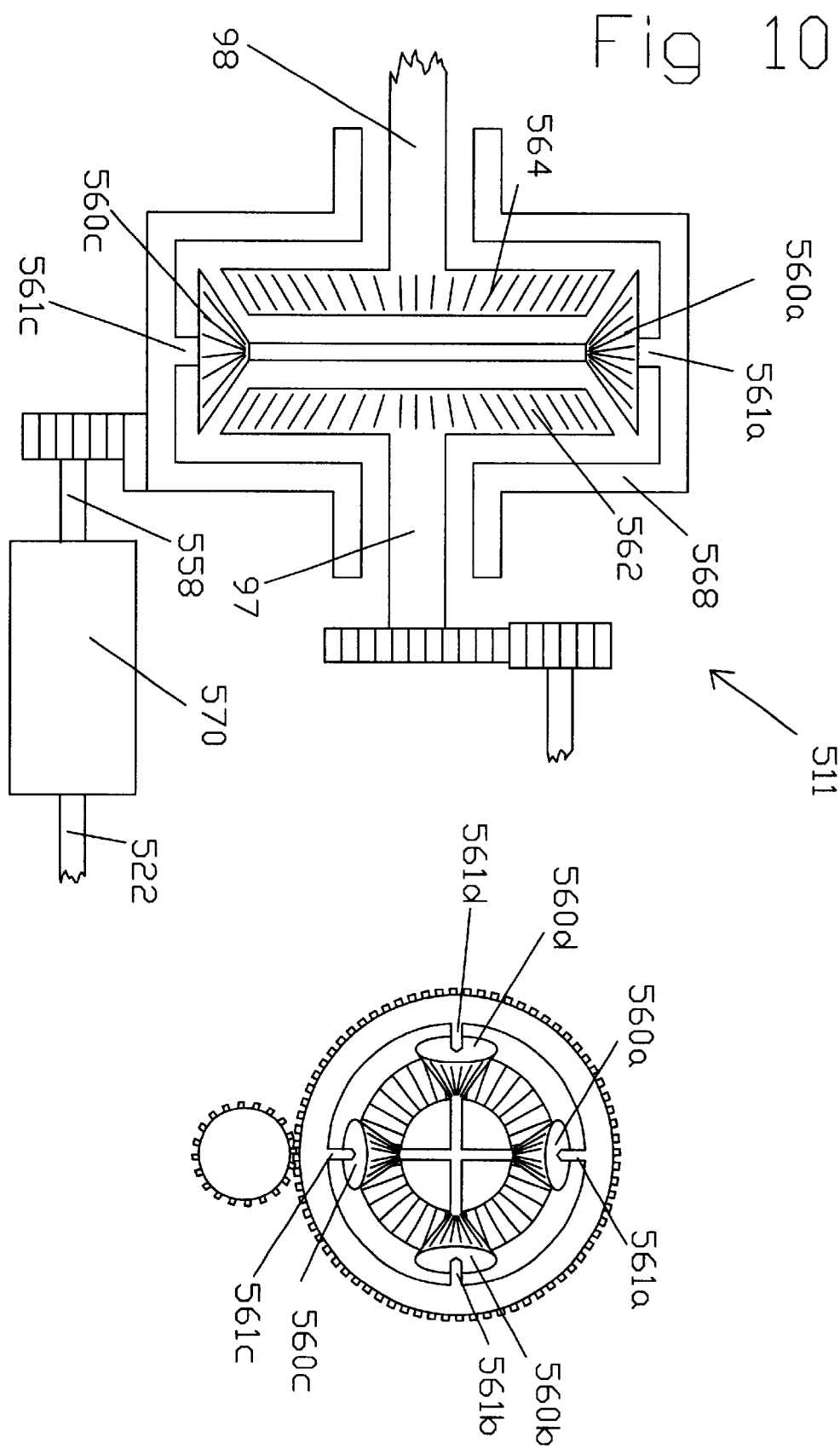
FIG. 10 is a diagrammatic schematic drawing of an Oversteer Gearbox

FIG. 10—Oversteer Gearbox 130

FIG. 10 is a detail of the oversteer gearbox 130 (FIG. 9) containing an inner gearbox 570 and a set of planetary gears 560, 562, 564. The oversteer gearbox 130 (FIG. 9) combines two rotational inputs. The first is from the steering input system at the front of the dolly, which is received from shaft 98b. The second rotational input is from the back of the dolly from trailer orientation shaft 126. When the shaft trailer orientation shaft 126 enters the oversteer gearbox 130 (FIG. 9), it enters the inner gearbox 570. Then the rotational input is geared up or down and sent out from inner gearbox 570 to shaft 558. The planetary gears 511 and shell 568 add this rotation to the rotation received from the front steering input section. The oversteer gearbox 130 then sends this combined rotational output along a shaft 97 into the front of the main gearbox 115 (FIG. 9) directly behind it.

In inner gearbox 570 the rotational input from the trailer orientation system in the back is first geared down to provide the desired level of oversteer compensation. More oversteer will cause the dolly to swing wider when turning a corner, and less oversteer will cause the dolly to not swing so wide. The rotational input is then combined with the steering input from the front of the dolly using a system of planetary gears 511. Inside the system of planetary gears 511, four smaller 90-degree gears 560a, b, c, d revolve around two central larger 90-degree gears 562, 564 that carry the rotation in from the front and out to the main gearbox 115 (FIG. 9) in the back respectively. The four smaller 90-degree gears 560a, b, c, d are mounted on shafts 561a, b, c, d which attach solidly to the shell 568 and which form a rigid "X" shape between the two central larger 90-degree gears 562, 564. The rotational input from the trailer orientation system is placed by a system of gears onto the outer planetary "shell" 568. If the planetary shell 568 is held stationary, rotation is simply passed straight through from the front to the back, reversing the direction of rotation but with no change in the magnitude of the rotation, as the planetary gears 560a, b, c, d maintain their position and transfer the rotation between the two central large 90 degree gears 564, 566. If the trailer 80 (FIG. 1) rotates with respect to the dolly, this rotation causes the planetary shell 568 to move around its central axis, and this rotation is added to or subtracted from the rotation coming into the front. Note that the direction of rotation of the shaft leaving the back of the oversteer gearbox 130 must be again reversed to maintain the original rotation information received from the front.

Overview of the Switchable-Steering-Ratio Geared Dolly without Oversteer

This alternate embodiment of the invention in FIG. 11 is identical to the Switchable-Steering-Ratio Geared Dolly in FIG. 7,8,9,10 with oversteer except that it demonstrates the possibility of constructing a Switchable model without the use of the oversteer correction. At the front of the dolly tongue 55 there is a forward partial-circular track 100, which is connected at the sides to a bar 107 that pivots with the front trailer 40. As the front trailer 40 rotates with regard to the dolly tongue 55, the forward partial-circular track 100 passes between the roller 110 and the gear 112. The forward partial-circular track 100 is toothed on its outer edge, and runs between the roller 110 and the gear 111 mounted on the dolly tongue 55. The roller 110 and gear 111 press tightly against the forward partial-circular track 100, keeping it from slipping. Below the gear 111 is an angle gear 112 that meshes with an angle gear 113, converting the rotation to horizontal. Connected to the angle gear 113 is a shaft 98, which runs to the gearbox 130. To determine if the front trailer 40 is aligned with the dolly tongue 55, there is a roller 104 that when the dolly tongue 55 and the centerline of the front trailer 40 are aligned, activates an enabling air valve 132 that transmits a signal to the main gearbox 115. At the rear of the dolly tongue 55 there is a lower rear partial-circular track 75 which is connected at the ends to a track attachment plate and assembly 73 that in turn attaches solidly to the steering axle central pivot support 58 just above the tongue of the dolly. Like the front partial-circular track 100, it runs between a roller 121 and a gear 118. Above the gear 118 is an angle gear 120, which, with the other angle gear 119, converts the rotation to a horizontal axis. Connected to the angle gear 119 is a shaft 122, which runs to the neutral lock gear box 125. As in the front, there is a roller 105 that activates an enabling air valve 150 when the centerline of the dolly 55 and the centerline of the steering axle assembly 60 are aligned, transmitting a signal to the neutral lock gear box 125.

FIG. 11: The Switchable-Steering-Ratio Geared Dolly without the Oversteer Correction This alternate embodiment of the invention is physically identical to the Switchable-Steering-Ratio Geared Dolly with oversteer if we omit the sections relating to the measurement of the trailer orientation and the sections relating to the oversteer gearbox 130 (FIG. 9). There will be no upper rear partial-circular track 140 and none of the gearing between the upper rear partial-circular track 140 and the oversteer gearbox 130. There will, of course, be no oversteer gearbox 130 at all. The trailer mounting bar 66 will be mounted solidly on the top of the axle central pivot support 58 (FIG 7), instead of having the ability to swivel. The remainder of the dolly will be unchanged.

For a detailed description of this alternate embodiment of the invention, simply refer to the detailed description of the Switchable-Steering-Ratio Geared Dolly with oversteer.

Figure 12:
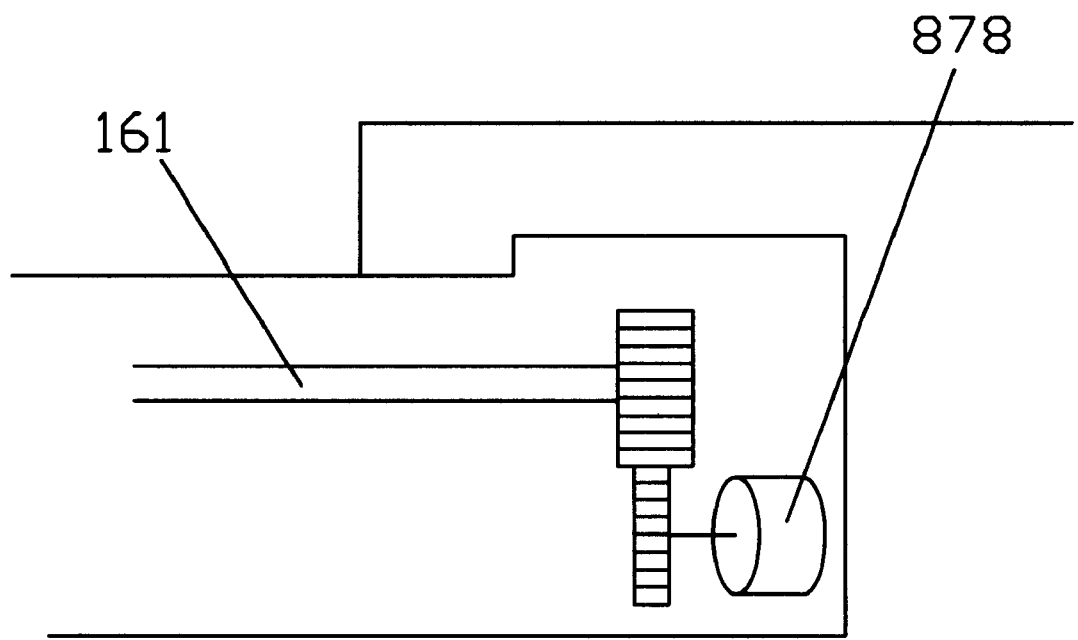
FIG. 12 is a diagram of a travel distance sensor

FIG. 12—Dolly Travel Distance Sensors

FIG. 12 shows a view of the dolly travel distance sensors 878a, b (optical rotation encoders or some other such sensors) that measure the rotation of the dolly drive axles 161 inside the axle housings of the front two sets of dolly running wheels 71 L, R. The, drive axles 161 are connected to the running wheels 71 L, R in a manner that is similar to the way the drive axles of a tractor are attached to the drive wheels of the tractor. The rotation measured by these sensors is used by the controller 49 to determine the timing of data acquisition from the sensor array and also as a second source for the oversteer correction data and make allowance for the above differences.

Operations

A Dolly Using Gears and a Gearbox for Switching Between Steering Ratios and Oversteer for Assistance in Turning Corners Introduction The primary features of interest in this alternative embodiment of the invention is its switchability between at least two steering ratios without stopping the vehicle and its use of oversteer for turning corners. At least one of these steering ratios must be designed to provide more stability at higher speeds, and at least one ratio must be designed for better cornering ability and maneuverability at lower speeds. In this alternative embodiment the stability mode is the mode designed to provide stability at higher speeds. It corresponds roughly to the mode of steering used in the Steerable Type A dolly of the prior art. In this alternative embodiment the cornering mode is the mode designed to provide more maneuverability. This mode corresponds to a mode of steering that would be produced by crossed steering arms. In the cornering mode, an oversteer correction is used to enable a wider swing around corners than would be possible with the cornering mode alone.

Input to the Steering System

In overview, the input to the steering system of the Switchable-Steering-Ratio Geared Dolly with oversteer is derived from the angle between the forward trailer 40 and the dolly 50. This input will be picked up by the forward partial-circular track 100 and transferred via the forward part of the geartrain into the oversteer gearbox 130. Inside this oversteer gearbox 130, the rotations from the front will be combined with the rotations from the trailer orientation system using a planetary system of gears. The combined rotations will then be sent on back into main gearbox 115. The main gearbox 115 chooses the ratio, which will determine many of the characteristics of the dolly's steering. Then the output from the main gearbox 115 is transferred via the neutral lock gearbox 125 and the back part of the geartrain to the lower rear partial-circular track 75. The back of the lower rear partial-circular track 75 is attached to a track attachment plate and assembly 73 that is in turn solidly attached to the steering axle central pivot support at a point just above the tongue of the dolly, and causes the axles 72F and 72B to rotate about their pivot points, the axle central pivot support 58, in response to the original input from the front of the dolly as processed by the various gearboxes.

As we mentioned above, the angle between the forward trailer 40 and the dolly 50 provides the primary input for our steering system. As this angle varies during a turning operation, we see from FIG. 8 that the forward partial-circular track 100 moves between the roller 110 and the small gear 111. These two rotary members are pressed tightly against the two sides of the forward partial-circular track 100 to prevent slippage of the gear 111, so that the gear 111 is forced to rotate by the movement of the forward partial-circular track 100. This rotational movement is ratioed up by 90-degree gear 112 and converted to rotation about an axis parallel to the main axial member of the dolly tongue 55 by the 90-degree gear 113. The shaft 98 then carries this rotational movement back into the oversteer gearbox 130. This oversteer gearbox 130 also receives rotational input from the trailer orientation shaft 126. The rotation of the trailer orientation shaft 126 is caused by, and is an indicator of, the rotation of the trailer mounting bar 66 and thus of the trailer 80 (FIG. 1) itself around the trailer mounting bar central pivot 66. The rotation of this trailer orientation shaft 126 will be added to the rotation of the shaft 118 coming into the front of the oversteer gearbox 130, and the combined rotations will be output through the back shaft 97 to the main gearbox 115. A detail of this operation is shown in FIG. 10.

Operation of the Gearbox

The primary purpose of this main gearbox 115 is to select the dolly operating mode by changing the ratio and/or the direction of the rotational input from the front shaft 97 to a new output rotation of the rear shaft 129. Although any number of different steering ratios could be easily provided, only two operating modes are enabled in this embodiment. We will assume for our purposes here that the forward partial-circular track 100 and the lower rear partial-circular track 75 have the same diameter and that corresponding gears in front of the main gearbox 115 are the same size as their corresponding gear behind the main gearbox 115. If the direction of the input from the front is unchanged by the main gearbox 115 and the gear ratio is equal to the value calculated in the theory section below, the dolly 50 will operate in the most stable mode. If the direction of the input is reversed but the gear ratio is equal to −1 (−1 revolution out to the back)/(1 revolution in at the front), the dolly 50 will operate in the cornering mode. These modes will be selectable by the driver from the cab without stopping the vehicle. Actual shifting will not begin, however, until the dolly 50 is lined up straight forward as sensed by the rear enabling switch 150. This prevents the off centering and skewing that would occur if shifting could be initiated at any position. In this embodiment, shifting is initiated by activating the valve on the control box 152 in the driver's cab to place air pressure on either the stability air line 154 or the cornering air line 156. Note that a substantial interval of time may elapse before shifting is completed, since the shifting will not be initiated in the main gearbox 115 until the rear section of the dolly 50 is in alignment as signaled by the rear enabling switch 150. Air pressure in the stability air line 154 will shift the dolly 50 into the stability mode by shifting the main gearbox 115 to provide straight or forward rotation at a gear ratio as calculated in the theory section below. This gear ratio will depend on the relative lengths of the dolly 50 and the rear trailer 80, but will in general be around 0.6. Air pressure in the cornering air line 156 will shift the main gearbox 115 to provide reversed rotation at the output with a gear ratio of −1 (−1 rotation out to the back/one rotation in from the front). Switches inside the main gearbox 115 will inform the driver as to which mode is currently in force by activating indicator lights 153 on the dashboard. All mode switch actuators in main gearbox 115 are stable in position so that loss of air will not cause any mode switch. In this embodiment, then, two control air lines 154, 156 and two switch indicator lights 153 on the control box 152 will comprise the communication network between the drivers cab and the Switchable-Steering-Ratio Geared Dolly with oversteer which is an alternative embodiment of this invention.

The specifications for ordering the main gearbox 115 were given in the description section, including that all gear shifting should be performed by high-pressure air. All gear positions should be stable; i. e. no changes in gear position can occur if no high-pressure air is applied to the system. The input rotation enters the front of the main gearbox 115, and two gear ratios must be available to the shaft 129 coming out the back. The gear shifting should be performed by only two high-pressure airlines 154, 156.

Pressure on the first air line, which we will call the stability air line 154, should cause the output rotation to be shifted to straight or forward, with the magnitude of the gear ratio being equal to the value calculated in the theory section for stability mode. This gear ratio will depend on the relative lengths of the dolly 50 and the rear trailer 80, but will in general be around 0.6. Pressure on the second air line, which we will call the cornering air line 156, should cause the output rotation to be shifted to reversed with a gear ratio of −1 (−1 rotation out to the back/one rotation in from the front).

In addition to the gearing requirements, the main gearbox 115 will provide some control and information functions. The main gearbox 115 must activate switches inside the main gearbox 115 when in a particular mode which will show the main gearbox 115 status to the driver using indicator lights 153 on the control panel 152 in the drivers cab.

At this point we will also note that the two high pressure air lines 154, 156 (FIG. 8) used to control the ratio shifting must be routed from the control panel 152 in the driver's cab to the forward enabling switch 132 and the rear enabling switch 150. When the rear-enabling switch 150 detects alignment, the air pressure is passed on to the neutral lock gearbox 125 and the ratio switching operation is initiated. When the forward enabling switch 132 detects alignment, the air pressure is passed on to the main gearbox 115 to allow completion of the ratio switching operation.

The control box 152 will be located in the driver's cab. The face of the control box 152 will have two indicator lights 153, one for each mode. The control box 152 will have an air valve 151 that will turn on high pressure air to either the stability air line 154 or the cornering air line 156, but not to both, with the other line in each case dumped to atmosphere. In review, two high-pressure airlines 154, 156 will be routed between the control box 152 and the dolly 50.

Operation of the Neutral Lock Gearbox

The shaft 129 coming out through the back wall of the main gearbox 115 goes through another wall and into the neutral lock gearbox 125. The neutral lock gearbox 125 performs its functions at the beginning and at the end of each shifting sequence. When the driver has applied pressure to one of the control air lines 154, 156, and when the rear enabling switch 150 has permitted that pressure to be transferred to the main gearbox 115, the neutral lock gearbox 125 starts a ratio shifting sequence by disconnecting all steering gears in front of the neutral lock gearbox 125 from all steering gears behind it and then locking the steering gears behind it into a static position. Then after all other shifting operations are completed, and when the forward enabling switch 132 indicates that the forward section is aligned, the neutral lock gearbox 125 completes the sequence by unlocking and reconnecting the gears behind it to the gears in front of it. Since no shifting sequence can begin unless the back enabling switch 150 has indicated that the rear section is in alignment and no shifting sequence can terminate unless the forward enabling switch 132 has indicated that the forward section is in alignment, this method assures that at the completion of each shifting sequence all sections are properly aligned and centered. In practice, of course, all these events may take place in a very short interval of time if the vehicles are traveling in a straight line, since all the actions are automatically controlled by air pressure. It is worth noting here that while the neutral lock gearbox 125 has the back section locked, the dolly 50 will be operating in the standard non-steerable A mode. This mode could thus be easily made available if desired, but it would have few advantages over the other two modes that are available.

Output from the Gearbox to Steer the Dolly Axle

In FIG. 8 the shaft 122 carries the output rotational movement from the neutral lock gearbox 125 to the gear 119. The gear 119 then picks up this movement, ratios it back down, and converts it back to rotation about a vertical axis. Gear 118, with the help of roller 120 then converts this rotational movement into movement of the lower rear partial-circular track 75 which then causes the transverse axles 72F and 72B to rotate about their axle central pivot support point 58, steering the dolly 50.

Summary and Miscellaneous for Switchable-Steering-Ratio Geared Dolly with Oversteer In summary, the input to the steering system of the dolly 50 is the angle between the back of the forward trailer 40 and the dolly 50. The output from the system is the orientation of the transverse axles 72F and 72B, and thus of the running wheels 70 R, 71 R and 70L, 71 R of the dolly 50. The manipulation of the input by the main gearbox 115 and by the oversteer gearbox 130 is the key to the steering characteristics of the dolly 50 in this alternative embodiment of the invention. When the main gearbox 115 is in the stability mode, the operation of the dolly 50 at higher speeds will be more stable. When the main gearbox 115 is in the cornering mode, the rear trailer 80 will be more maneuverable and will have less of a tendency to cut the corners during turning operations. When a substantial oversteer component is input, the dolly will oversteer in order to avoid cutting the corner with the trailer 80 (FIG. 1) it is carrying.

The behavior of the Switchable-Steering-Ratio Geared Dolly with oversteer during backing operations is of particular interest. Normally a "double" is almost impossible to back, but if the dolly is shifted into stability mode, this section will behave much like a single-axle trailer with a very long wheelbase. The string will then become only slightly harder to back than a single trailer.

Figure 13:
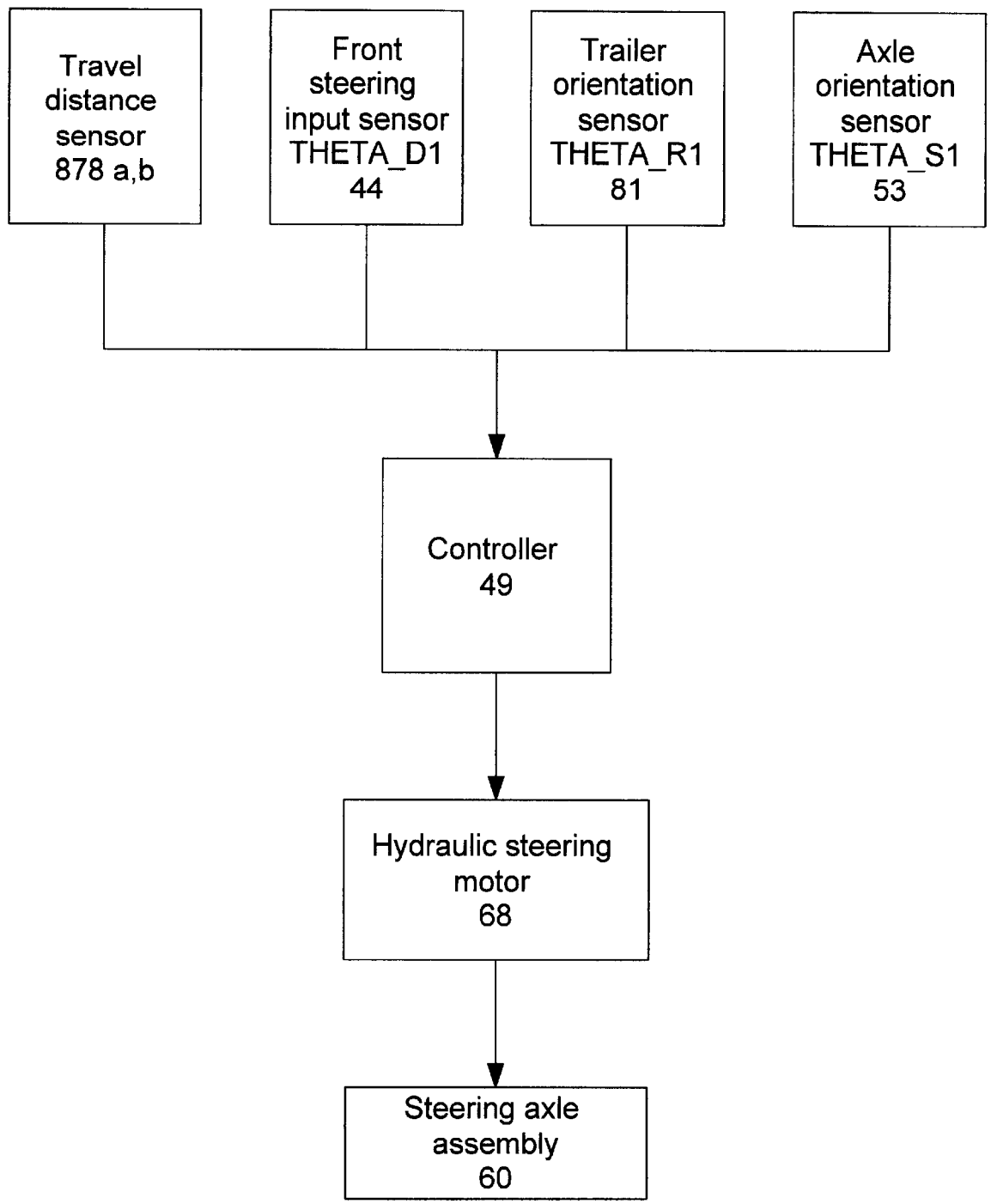
FIG. 13 is a diagram of the sensors and controller for the Variable Steering Ratio Digital Dolly with Oversteer Correction

A Dolly That Uses Controllers and Hydraulic Motors for Steering, that Continuously Varies the Steering Ratio Using the Software in the Controllers, and Which Uses Oversteer to Assist in Steering Around Corners The Variable-Steering-Ratio Digital Dolly with oversteer 50 shown in FIGS. 1, 2, 3, 4, 5 is a preferred embodiment of the invention. It is similar to the Switchable-Steering-Ratio Geared Dolly with oversteer except that the ratio steering information and the oversteer information are transferred from the front steering input sensor, THETA_D1 44, the axle orientation sensor THETA_S1 53, and the trailer orientation sensor THETA_R1 81 to the powered steering system of the dolly 50 via the controller 49. An additional source of oversteer information will be available in the form of an accumulated measurement of the difference between the rotation of the dolly wheel 71 L and the dolly wheel 71 R that is then decayed at a prescribed rate per linear foot of travel. Pressurized hydraulic fluid is utilized as an energy source. The software in controller 49 will be able to adjust the amount of oversteer as needed, and will also continuously vary the steering ratio as the dolly speed varies so that no gearbox will be required. Preferably, this steering controller 49 will be implemented in software and executed on a processor based system (not shown) that includes random access memory (not shown) and other types of memory (not shown). A diagram of the information flow for this embodiment of the invention is shown in FIG. 13. The controller electronics package includes the steering controller 49 itself, the pulse counting circuits, the analog-to-digital converters, and any other electronic equipment that may be needed to support the controller along with its input and output peripheral devices and circuits.

At the front of the dolly 50, an optical pulse rotation encoder (or some other such sensor) 856 will record the rotation about the pivot point near the dolly hitch and transfer this information via pulse counting circuit 858 to the controller 49. At the rear of the dolly 50 another optical pulse rotation encoder (or some other such sensor) 864 will record the rotation of the steering axle assembly as it changes orientation. A third optical pulse rotation encoder (or some other such sensor) 865 will record the rotation of the rear trailer as it moves from side to side with respect to the dolly tongue to provide input to the oversteer algorithms.

A reversible hydraulic motor 866 geared down to a moderate speed will provide the energy for changing the orientation of the axles 72F and 72B when the software detects that movement is required. This hydraulic motor 866 is provided with an automatic braking mechanism that locks the gear train into position at times when no action is required of the hydraulic motor 866. Low air pressure and/or low hydraulic pressure will also cause the hydraulic motor 866 to move to its center position and then activate the braking mechanism for the steering control. An air motor operates a hydraulic pump to keep the hydraulic fluid in one reservoir pressurized, while the return fluid is stored in an open tank.

The software in the controller 49 will compare the number of degrees of rotation input from the front sensor to the number of degrees of rotation input from the steering axle orientation sensor. For a 1-to-1 reverse ratio without oversteer input, the software will control the hydraulic motor 866 to maintain exactly the same number of negative degrees of rotation of the steering axle assembly as it senses of positive degrees of rotation from the front input sensor (see definition of positive angles below for sign convention). Other steering ratios for other modes would be handled by simple mathematical manipulation of the input from front input sensor and from the axle orientation sensor. The details of this operation will be shown below.

The data from the trailer orientation sensor and/or the delayed difference between the rotation information received from the two dolly wheels 71 L, R will be multiplied by an appropriate oversteer factor and combined with the input froth the front input sensor to add oversteer steering behavior to the dolly. The algorithms add the oversteer data to the information obtained from the front input sensor before any adjustments are made for the various steering ratios. Thus the effect of the oversteer will be reduced along with the reduction in maneuverability as the-steering ratio [(positive degrees of rotation of the steering axle assembly)/(positive degrees of rotation of the front input sensor)] moves from a more negative ratio toward a ratio of zero. Since the stability modes (steering ratios greater than zero) minimize steering behavior that causes movement of the dolly tongue with respect to the trailer carried by the dolly, and since the stability modes will not be needed when turning sharp corners at lower speeds, oversteer behavior should not produce significant effects when these steering modes are selected.

As mentioned above, an optical rotation encoder 878 will record the rotation of the drive shaft for each front dolly wheel 71 L, R. The software in the controller 49 will use this information in two ways. The sum of the counts will be scaled to yield the distance traveled by the dolly in any given time interval. The difference between the counts for the two front wheels 71 L, R will be scaled to yield a measure of the amount of cornering that the dolly wheels 71 L, R are undergoing. If this difference is accumulated for each interval of travel and then decayed at a prescribed rate per linear foot of travel, it can be used along with or instead of the input from the trailer orientation sensors as input to the oversteer algorithms.

Details of Software Algorithms

At this point we will attempt to describe the details of the algorithms and the physical basis for the algorithms that will control the steering behavior of the dolly. The controller 49 will complete one full cycle of calculations each time a distance has been traveled that corresponds to one "travel interval". The pulse counters (inside the electronics package with the controller) then, will accumulate counts until they detect a "travel interrupt" from a circuit that is counting and scaling the pulses from the wheel encoders. When the travel interrupt is received, each pulse counter (inside the electronics package with the controller) will transfer its counts to the controller 49 in the form of a digital number.

Note that the optical rotation encoders, steering input sensor THETA_D1 44, axle orientation sensor THETA_S1 53, trailer orientation sensor THETA_R1 81, and travel distance encoders 878a, b, are designed so that negative rotation will be detected by the pulse counters (inside the electronics package with the controller) and subtracted off the accumulated totals.

For each travel interval, the controller 49 now has a number for each encoder that represents the movement of that encoder during that travel interval. The remainder of the processing will take the form of mathematical manipulation of these numbers. The controller 49 will maintain running totals of the counts input from the encoder on the front input section of the dolly steering system (front steering input sensor THETA_D1), the encoder on the trailer orientation system (trailer orientation sensor THETA_R1 81), and the encoder measuring the rotation of the dolly steering axle assembly(axle orientation sensor THETA_S1). At the completion of each travel interval, the controller 49 will apply a calibration adjustment and a scaling factor to the above running totals to convert them into calibrated degrees of positive rotation. The angle of the front steering input sensor, THETA_D1 44, will be positive when the first trailer is rotated clockwise of the straight ahead position with respect to the tongue of the dolly. THETA_D1 will be negative when the first trailer is rotated counterclockwise of the straight ahead position. The angle of the trailer orientation section, THETA_R1 81, will be positive when the tongue of the dolly is rotated clockwise of the straight ahead position with respect to the trailer carried by the first dolly. THETA_R1 will be negative when the tongue of the dolly is rotated counterclockwise of the straight ahead position. The angle of the axle orientation section, THETA_S1 53, will be positive when the steering axle assembly is rotated clockwise of the straight ahead position with respect to the tongue of the dolly. THETA_S1 will be negative when the steering axle assembly is rotated counterclockwise of the straight ahead position.

The pulses from the travel distance encoders 878a, b on the right and the left front dolly wheels 71 R and 71 L will each go to two different counters. Both sets of pulses will be input to a circuit that will accumulate counts until it reaches a predetermined point where the average of the distance traveled by the two wheels is one "travel interval". At this point, this circuit generates a "travel interrupt" that causes the controller 49 to acquire the accumulated counts and/or data from each counter and/or analog sensor. The counters for the wheel encoders and for all the data encoders then reset to zero counts and begin accumulating counts again. Since the Digital Dolly that does not use oversteer does not have travel distance encoders, it will acquire data based on fixed time intervals rather than on the basis of fixed travel intervals.

The pulses from the travel distance encoders 878a, b on the dolly wheels also go to counters that are queried by the controller 49 at the end of each travel interval. At the completion of each travel interval, the processor will apply a calibration adjustment and a scaling factor to these counts to convert them to calibrated feet of linear travel during the travel interval. The numbers obtained from this operation will, again, be used for two distinctly different purposes.

First, two decayed running totals of the difference between the travel of the left wheel and the travel of the right wheel will be maintained by the controller 49.

$$DELT2=DELT2+(DELT\_L-DELT\_R)-\text{DECREMENT}$$

And $$DELT1=DELT1+(DELT\_R-DELT\_L)-\text{DECREMENT}$$

Where DELT2 is the decayed running total of the difference between the travel of the left wheel 71 L minus the travel of the right wheel 71 R, and DELT1 is the decayed running total of the difference between the travel of the right wheel 71 R minus the travel of the left wheel 71 L. Also, DELT_L is the travel of the left wheel 71 L in the latest travel interval and DELT_R is the travel of the right wheel 71 R in the latest travel interval. The number DECREMENT represents the amount of decay in each travel interval and can be adjusted as needed to change the oversteer characteristics of the system. Generally any accumulation in the delayed running totals DELT1 and DELT2 should decay within less than 100 feet or so to zero. At the end of any travel interval in which DELT1 is less than zero, we will set DELT1 =0. At the end of any travel interval in which DELT2 is less than zero, we will set DELT2 =0.

At the completion of each travel interval, the processor will also use the distances traveled during the interval by the left and right wheels, DELT_L and DELT_R to complete the following calculation:

$$SPD=[2*AV*SPD*DELT\_TIME+DELT\_L+DELT\_R]/[(2*AV+2)*DELT\_TIME)]$$

Where SPD is the average running speed, DELT_R and DELT_L are the distances traveled during the latest interval of the right and left front wheels 71 L, R respectively, and DELT_TIME is the number of seconds of time since the last travel interrupt. The number AV is representative of the number of intervals over which the average speed is calculated. A larger AV will produce a SPD that varies more slowly with momentary velocity changes.

The steering ratio could be varied as a function of turning angle, speed, or any other such variable, but in this preferred embodiment of the invention, the steering ratio will be varied continuously by the processors as the speed of the dolly changes. At higher speeds, the controller 49 will automatically control the dolly in a manner that is more stable (a more positive steering ratio), and at lower speeds, the processors will automatically control the dolly in a manner that has better cornering ability (a more negative steering ratio). In order to accomplish this we will choose a correction factor, CORR, that is dependent upon the average speed of the dolly. From the above discussion related to geared steering control, a steering ratio of −4 produced very responsive steering and a steering ratio of about +0.6 (depending upon the ratio of the dolly length to the length of the dolly and the rear trailer 80 together) produced very stable steering. If we wanted to vary the correction factor CORR linearly between −4 and +0.6 as the speed increased from 8 ft/sec to 30 ft/sec, we could write:

$$CORR=M*SPD+B$$

Where M is the slope of the line and B is the intercept. Then if we substitute into this equation at the two chosen points, we have:

$$CORR=-4=M*8+B$$

And $$CORR=+0.6=M*30+B$$

Solving these two equations for the two unknowns, we get:

$$M=0.2091$$

And $$B=-5.673$$

Therefore, for the above requirements we have:

$$CORR=0.2091*SPD-5.673 \text{ whenever } 8<SPD<30 \text{ ft/sec.}$$

If SPD is less than 8, then we will set:

$$CORR=-4 \text{ for } SPD<8 \text{ ft/sec.}$$

And if SPD is greater than 30, we will set:

$$CORR=0.6 \text{ for } SPD>30 \text{ ft/sec.}$$

The processor will then determine the steering necessary at each travel interval by the following calculation:

$$DELTA=[THETA\_D1+FAC1*THETA\_R1+FAC2*(DELT1-DELT2)]*CORR-THETA\_S1$$

where FAC1 and FAC2 are the oversteer factors for the trailer orientation system and the accumulated dolly wheel delayed difference system respectively, and DELTA is the amount of movement needed by the axle steering system. A positive DELTA will cause the hydraulic motor to move the dolly axles 72F and 72B more to the right and a negative DELTA will cause the hydraulic motor 68 to move the dolly axles 72F and 72B more to the left. If the absolute value of DELTA is larger, the hydraulic motor 68 will move the axles 72F and 72B more quickly. During operation, the hydraulic motor 68 should act to maintain DELTA near zero.

More Detailed and/or Theoretical Information

The above discussion contains all the information that is necessary to understand the parts of the ratio type steering and/or of oversteer which are relevant to what is claimed by this patent, but a little more detail might help the reader to understand some of the less obvious points. The following presentation is believed to be correct, but in any case does not affect the validity or value of a trailer system having steering ratios that can be switched without stopping the vehicle and/or using oversteer to assist in turning corners.

Conditions Necessary for "Maximum Stability"

As mentioned above, the stability modes of the Variable-Steering-Ratio Digital Dolly are roughly equivalent to the operation of the Steerable Type A dolly of the prior art. When the forward trailer 40 turns to the right, the controller 49 (or the gearbox 115) causes a rotation of the dolly axles 72F and 72B about a vertical axis so that the back of the dolly 50 also swings to the right, cutting across the corner as the turn is completed. If the steering ratio is just right, the dolly 50 will stay almost exactly between the center hitch-point of the forward trailer and the center of the rear axle of the trailer carried by the first dolly. In this configuration, the rear trailer 80 and the dolly 50 act much like a single unit and handle in a manner similar to the way a single axle trailer with a very long wheel base would handle.

In general, for the dolly 50 to remain directly aligned with the centerline of the rear trailer 80 without sideways scrubbing of the tires the axle must be oriented according to the following formula:

$$\text{tangent } (THETA\_S1)=[(LENGTH\_R1)/(LENGTH\_R1+LENGTH\_D1)]*\text{tangent } (THETA\_D1)$$

where THETA_S1 is the angle between the centerline of dolly 50 and the perpendicular to the dolly axles 72F and 72B, THETA_D1 is the angle between the centerline of the forward trailer and the centerline of the dolly 50, LENGTH_R1 is the distance from the kingpin where the rear trailer 80 attaches to the dolly 50 to the center of the back axle of the rear trailer 80, and LENGTH_D1 is the length of the dolly 50, from the attachment point at the front of the dolly 50 to the point where the kingpin of the rear trailer 80 attaches to the dolly 50.

If only small turning angles are considered then THETA_S1 is approximately equal to tangent THETA_S1, and THETA_D1 is approximately equal to tangent THETA_D1. The above formula then reduces to:

$$THETA\_S1=(LENGTH\_R1/LENGTH\_R1+LENGTH\_D1)*THETA\_D1$$

If the length of the rear trailer 80 is 30' and the length of the entire vehicle assembly is 45', the controller 49 must rotate the dolly axle 2 degrees for every 3 degrees of movement between the centerline of the forward trailer 40 and the dolly 50 centerline. If the steering ratio [(positive degrees of rotation in from the steering axle orientation sensor)/( positive degrees of rotation in from the front steering input sensor)] approaches zero, the maneuverability of the linked vehicles is improved at the expense of stability as the dolly 50 approaches the configuration of the standard Type A dolly.

In the cornering modes, the Variable-Steering-Ratio Digital Dolly behaves as if it has steering arms that are crossed. When the forward trailer 40 turns to the right, this dolly 50 turns its steering axle to the left to swing wide around the corner. A negative steering ratio [(negative degrees of rotation produced in the steering axle orientation sensor when positive degrees of rotation are input from the front steering input sensor)] for these modes is not as critical as for the stability modes. It will be clear, however, that negative steering ratios that approach zero will produce less pronounced cornering capabilities but better stability as the mode again approaches the behavior of the standard Type A dolly. Steerable Type B behavior is produced if we let the steering ratio of the Variable-Steering-Ratio Digital Dolly approach negative infinity (infinite negative degrees of rotation in from the steering axle orientation sensor for one positive degree of rotation in from the front steering input sensor), that is, even the slightest turn causes a large correction and the dolly swings instantly into line behind the forward trailer. For this embodiment, some kind of device or mechanism must be used to force the dolly to move in the direction that its wheels are pointing because the required movement is so strongly against the natural tendency of the system.

GENERALITY OF CONCEPTS

The concepts involved in this invention are most easily explained by describing specific devices that "embody" or exemplify these concepts. An expert in the field will quickly see that, in almost all cases, the invention could easily be constructed using any device that performs the desired function. The description of any particular embodiment of the invention is not intended in any way to limit the invention to some particular embodiment, but only to assist the reader in understanding the concepts involved in this invention.

What we claim is:

1. A trailer dolly for connecting a rear trailer to a front trailer comprising a dolly, a controller, a motor, and a plurality of sensors, wherein said dolly further comprises a tongue, a means for allowing a rear trailer to rotate with respect to said tongue, and a steering axle assembly, and wherein said plurality of sensors further comprises a means for determining the angle between a rear trailer and said tongue, a means for determining the angle between said steering assembly and said tongue, and a means for determining the angle between said tongue and a front trailer.

2. A trailer dolly as in claim 1 wherein said means for allowing a rear trailer to rotate with respect to said tongue is a fifth wheel and wherein said means for determining the angle between a rear trailer and said tongue is a rear trailer orientation sensor, said means for determining the angle between said steering assembly and said tongue is an axle orientation sensor, and said means for determining the angle between said tongue and a front trailer is a front pivot orientation sensor.

3. A trailer dolly as in claim 1 wherein said steering axle assembly further comprises one or more pairs of dolly wheels, and wherein said plurality of sensors further comprises a means for measuring the amount of rotation of said dolly wheels.

4. A trailer dolly as in claim 2 wherein said steering axle assembly further comprises one or more pairs of dolly wheels, and wherein said plurality of sensors further comprises dolly wheel rotation sensors.

5. A trailer dolly as in claim 2 wherein said controller receives input signals from said rear trailer orientation sensor, said axle orientation sensor, and said front pivot orientation sensor, processes said input signals, and transmits an output signal to said motor.

6. A trailer dolly as in claim 4 wherein said controller receives input signals from said rear trailer orientation sensor, said axle orientation sensor, said front pivot orientation sensor, and said dolly wheel rotation sensors, processes said input signals, and transmits an output signal to said motor.

7. A trailer dolly as in claim 5 wherein said controller determines how to steer said steering axle assembly using said motor to rotate said steering axle assembly with respect to said tongue in order to apply an appropriate steering ratio depending upon the input signals from said rear trailer orientation sensor, said axle orientation sensor, and said front pivot orientation sensor.

8. A trailer dolly as in claim 6 wherein said controller determines how to steer said steering axle assembly using said motor to rotate said steering axle assembly with respect to said tongue in order to apply an appropriate steering ratio and oversteer correction depending upon the input signals from said rear trailer orientation sensor, said axle orientation sensor, said front pivot orientation sensor, and said dolly wheel rotation sensors.

* * * * *